(12) United States Patent
Wittek et al.

(10) Patent No.: US 11,008,514 B2
(45) Date of Patent: May 18, 2021

(54) LIQUID CRYSTAL MEDIUM

(71) Applicant: MERCK PATENT GMBH, Darmstadt (DE)

(72) Inventors: Michael Wittek, Darmstadt (DE); Dagmar Klass, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/771,514

(22) PCT Filed: Oct. 5, 2016

(86) PCT No.: PCT/EP2016/001647
§ 371 (c)(1),
(2) Date: Apr. 27, 2018

(87) PCT Pub. No.: WO2017/071790
PCT Pub. Date: May 4, 2017

(65) Prior Publication Data
US 2018/0340121 A1    Nov. 29, 2018

(30) Foreign Application Priority Data

Oct. 27, 2015    (DE) .................... 10 2015 013 822.7

(51) Int. Cl.
| | | |
|---|---|---|
| *G02F 1/1333* | (2006.01) | |
| *C09K 19/30* | (2006.01) | |
| *C09K 19/34* | (2006.01) | |
| *C09K 19/04* | (2006.01) | |
| *F21S 41/64* | (2018.01) | |
| *G02F 1/137* | (2006.01) | |

(52) U.S. Cl.
CPC ...... *C09K 19/3003* (2013.01); *C09K 19/3066* (2013.01); *C09K 19/3444* (2013.01); *C09K 19/3458* (2013.01); *C09K 2019/0466* (2013.01); *C09K 2019/301* (2013.01); *C09K 2019/304* (2013.01); *C09K 2019/3012* (2013.01); *C09K 2019/3016* (2013.01); *C09K 2019/3019* (2013.01); *C09K 2019/3021* (2013.01); *C09K 2019/3025* (2013.01); *C09K 2019/3037* (2013.01); *C09K 2019/3039* (2013.01); *C09K 2019/3042* (2013.01); *C09K 2019/3422* (2013.01); *F21S 41/645* (2018.01); *G02F 1/13706* (2021.01)

(58) Field of Classification Search
CPC ............ C09K 19/3003; C09K 19/3066; C09K 19/3444; C09K 19/3458; C09K 2019/0466; C09K 2019/301; C09K 2019/3012; C09K 2019/3016; C09K 2019/3019; C09K 2019/3021; C09K 2019/3025; C09K 2019/3037; C09K 2019/3039; C09K 2019/304; C09K 2019/3042; C09K 2019/3422; G02F 1/1333; G02F 2001/13706; F21S 41/645

USPC .................................................... 252/299.61
See application file for complete search history.

(56) References Cited

U.S. PATENT DOCUMENTS

| | | | |
|---|---|---|---|
| 7,201,951 B2 * | 4/2007 | Heckmeier ........ | C09K 19/3001 252/299.61 |
| 8,715,527 B2 * | 5/2014 | Luessem ............ | C09K 19/3402 252/299.01 |
| 2007/0170395 A1 | 7/2007 | Ichinose | |
| 2009/0101869 A1 | 4/2009 | Czanta | |

FOREIGN PATENT DOCUMENTS

| | | |
|---|---|---|
| CN | 102929021 B | 11/2014 |
| JP | 2006147377 A | 6/2006 |
| JP | 2013250369 A | 12/2013 |
| WO | 2009089898 A1 | 7/2009 |

OTHER PUBLICATIONS

International Search Report PCT/EP2016/001647 dated Jan. 2, 2017.
Notification of Reasons for Refusal in corresponding JP Pat. Appl. No. 2018-521562 dated Nov. 30, 2020. (pp. 1-3) and English translation thereof.

* cited by examiner

*Primary Examiner* — Geraldina Visconti
(74) *Attorney, Agent, or Firm* — Millen White Zelano & Branigan

(57) ABSTRACT

The invention relates to a liquid-crystalline medium based on a mixture of polar compounds having positive dielectric anisotropy, characterised in that it comprises one or more compounds of the formula I in a total concentration of ≥40%,

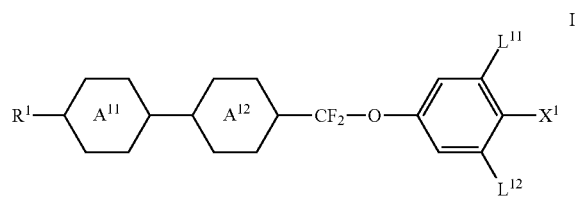

in which the parameters have the meanings indicated in claim 1, and to the use of the liquid-crystalline medium for electro-optical purposes, in particular in liquid-crystal light valves for lighting devices for motor vehicles, and to liquid-crystal light valves which comprise this medium and lighting devices for motor vehicles which contain such liquid-crystal light valves.

20 Claims, No Drawings

LIQUID CRYSTAL MEDIUM

The present invention relates to a liquid-crystalline medium and to the use thereof for electro-optical purposes, in particular for liquid-crystal light valves for use in lighting devices for motor vehicles, to liquid-crystal light valves containing this medium, and to lighting devices based on such liquid-crystal light valves.

Liquid crystals are used, in particular, as dielectrics in display devices, since the optical properties of such substances can be influenced by an applied voltage. Electro-optical devices based on liquid crystals are well known to the person skilled in the art and may be based on various effects. Devices of this type are, for example, TN cells having a twisted nematic structure or STN ("super-twisted nematic") cells. Modern TN and STN displays are based on an active matrix of individually addressable liquid-crystal light valves (the pixels) with integrated red, green and blue coloured filters for additive generation of the colour images.

The electro-optical effects utilised in liquid-crystal displays have recently also been used for other applications.

DE 19910004 A1 describes LCD screens as shade for adjusting the brightness distribution of lighting devices for motor vehicles as desired, by means of which the brightness distribution is to be adapted to the driving situation in a flexible manner.

Adaptive lighting systems of this type for motor vehicles (adaptive front lighting system, AFS) generate headlamp light which is adapted to the particular situation and ambient conditions and are capable of reacting, for example, to the light and weather conditions, the movement of the vehicle or the presence of other road users, in order to illuminate the environment constantly and optimally and avoid adversely affecting other road users. U.S. Pat. No. 4,985,816 discloses, for example, components in which a spatial light modulator in the form of a liquid-crystal display (LCD) panel consisting of a matrix of light-transmitting elements, analogously to the pixels of a liquid-crystal display, generates electrically switchable, complete or partial shading of the light cone with the aim of avoiding or reducing dazzling of the drivers of oncoming vehicles. Spatial light modulators of this type are, as already mentioned, also known as liquid-crystal light valves. Owing to the similar way of functioning as in projectors, the term projector-type vehicle lighting is also used. The image information for controlled shading of the light cone is preferably supplied here by a digital camera.

A liquid-crystal light valve in the sense of the present invention may include a single area for modulation of the light or a matrix of a multiplicity of identical or different part-areas corresponding to the pixels of a liquid-crystal display. A matrix of liquid-crystal light valves thus represents a special case of a monochrome matrix liquid-crystal display or can be regarded as a part thereof.

A lighting device in the sense of the invention is, in particular, an AFS or part of an AFS. A lighting device in the sense of the invention serves, in particular, for the illumination of an area in front of a vehicle or motor vehicle.

Motor vehicle in the sense of the invention is, in particular, a land vehicle which can be used individually in road traffic. Motor vehicles in the sense of the invention are, in particular, not restricted to land vehicles having a combustion engine.

In the liquid-crystal light valve disclosed in the above-mentioned U.S. Pat. No. 4,985,816, a TN cell is used as optical modulation element, which displays pixels in accordance with the desired brightness profile of the vehicle lighting, where, for example, an addressing voltage is applied to the TN liquid-crystal for modulation (control) of the degree of transmission of a pixel. Owing to the polarisers that are necessary there, only about half of the light of the light source can be utilised. An alternative, which is likewise based on a TN cell, which enables more than only half of the light of the light source of the lighting device to be rendered useful is disclosed in DE 10 2013 113 807 A1. In this, the light is divided into two part-beams having planes of polarisation perpendicular to one another by means of a polarising beam splitter and guided through two separate liquid-crystal elements which can be switched separately from one another.

Lighting devices of this type are distinguished by comparatively high operating temperatures of typically 60-80° C., which makes particular demands of the liquid-crystal media used: the clearing points must be higher than 120° C., preferably higher than 140° C., and, owing to the strong exposure to light, these media must have particularly high light stability. This may under certain circumstances be favoured, for example, by the use of materials having extremely low birefringence. The liquid-crystal materials must, in addition, have good chemical and thermal stability and good stability to electric fields. Furthermore, the liquid-crystal materials should have low viscosity and give rise to relatively short addressing times, the lowest possible operating voltages and high contrast in the cells.

Furthermore, they should have a suitable mesophase, for example for the above-mentioned cells a nematic or cholesteric mesophase, at usual operating temperatures, i.e. in the broadest possible range below and above room temperature, preferably from −40° C. to 150° C. Since liquid crystals are generally used in the form of mixtures of a plurality of components, it is important that the components are readily miscible with one another. Further properties, such as the electrical conductivity, the dielectric anisotropy and the optical anisotropy, have to meet different requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high specific resistance, good light and temperature stability and low vapour pressure are desired for light valves in matrix liquid-crystal displays having integrated non-linear elements for switching individual pixels (MLC displays). Matrix liquid-crystal displays of this type are known, and the design principle can also be used for the lighting device according to the invention.

Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on the inside. Compared with the size of the pixel electrode, the TFT is very small and has virtually no adverse effect on the image.

The TFT displays and corresponding light valves for lighting devices usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff, Paris; STROMER, M., Proc. Eurodisplay 84, September 1984: Design of Thin Film Transistors for Matrix Addressing of Television Liquid Crystal Displays, pp. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or exposure to light. This is also relevant on use of light valves in lighting devices for motor vehicles, since the liquid crystal therein is subjected to high temperatures and light levels, and a low specific initial resistance and a rapid increase in the specific resistance on exposure generally correlates with low long-term stability.

The low-temperature properties of the mixtures from the prior art are also particularly disadvantageous. It is required that no crystallisation and/or smectic phases occur, even at low temperatures, and the temperature dependence of the viscosity is as low as possible. The MLC displays from the prior art thus do not satisfy the requirements for use in lighting devices.

There is thus still a great demand for liquid-crystal mixtures having very high specific resistance at the same time as a large working-temperature range and high light stability.

In the case of liquid-crystal light valves for lighting devices for motor vehicles, media are desired which facilitate the following advantages in the cells:
extended nematic phase range (in particular to high temperatures)
stable on storage, even at low temperatures
switchability at low temperatures
increased light stability.

With the media available from the prior art, it is not possible to achieve these advantages while simultaneously retaining the other parameters. For example, liquid-crystal media of the published specifications DE 102 23 061 A1 and DE 10 2008 062858 A1 have a low Δn, but the clearing points of around 80° C. are in a range which is too low for the application according to the invention.

The invention is based on the object of providing media, in particular for the above-mentioned liquid-crystal light valves for lighting devices for motor vehicles, which do not have the disadvantages indicated above or any do so to a lesser extent, and preferably at the same time have very high clearing points and low birefringence.

It has now been found that this object can be achieved if media according to the invention are used in liquid-crystal components.

The invention thus relates to a liquid-crystalline medium based on a mixture of polar compounds having positive dielectric anisotropy, characterised in that it comprises
a) one or more compounds of the formula I in a total concentration of ≥40%

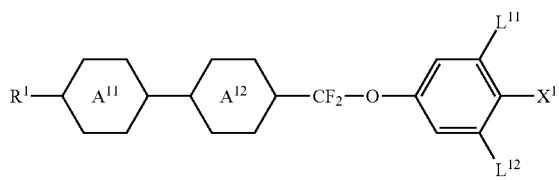

and optionally
b) one or more compounds of the formula II

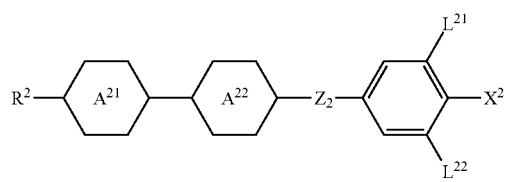

in which
$R^1$ and $R^2$ denote an alkyl or alkoxy radical having 1 to 15 C atoms, where one or more H atoms in these radicals may be replaced by F and, in addition, one or more $CH_2$ groups may each be replaced, independently of one another, by

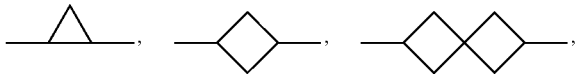

—C≡C—, —CH=CH—, —O—, —CO—O— or —O—CO— in such a way that O atoms are not linked directly to one another,

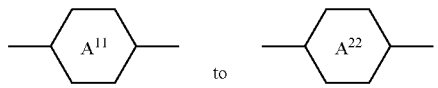

on each occurrence, identically or differently, denote

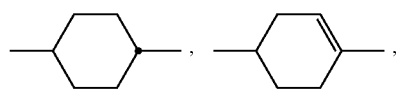

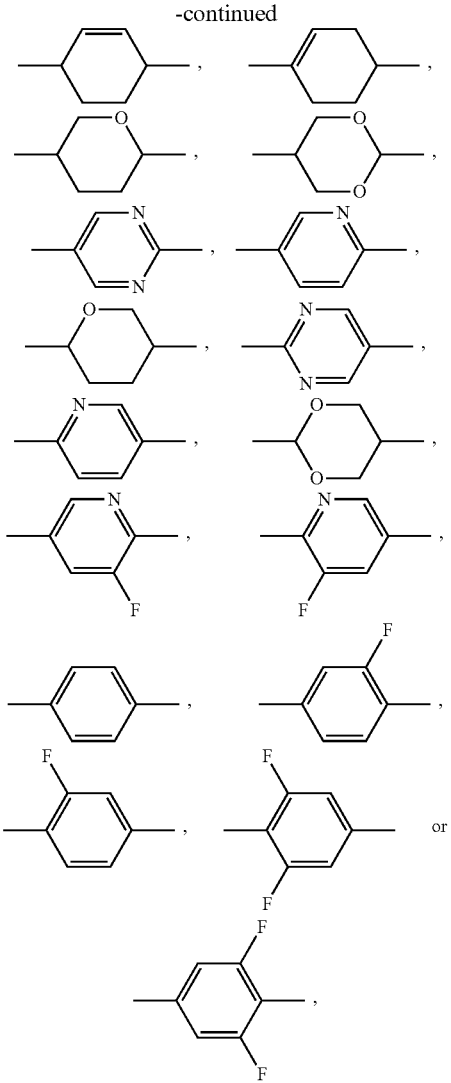

preferably

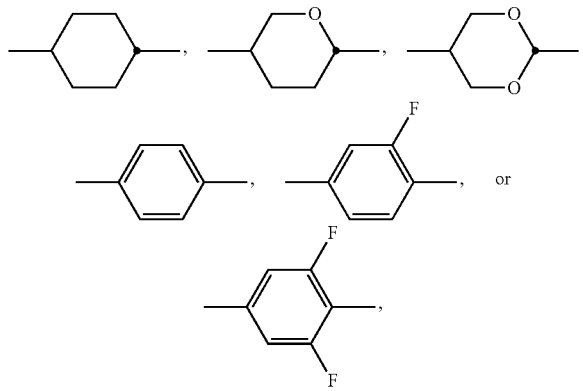

$L^{11}$, $L^{12}$, $L^{21}$ and $L^{22}$, independently of one another, denote H or F, preferably $L^{11}$ and/or $L^{21}$ denote F, $X^1$ and $X^2$ denote F, Cl, CN, a halogenated alkyl radical, a halogenated alkenyl radical, a halogenated alkoxy radical or a halogenated alkenyloxy radical having up to 6 C atoms, $Z^2$ denotes —CH₂CH₂—, —CF₂CF₂—, —COO—, trans —CH═CH—, trans —CF═CF—, —CH₂O— or a single bond, preferably —CH₂CH₂— or a single bond and particularly preferably a single bond.

In the present application, all atoms also include their isotopes. In particular, one or more hydrogen atoms (H) may be replaced by deuterium (D), which is particularly preferred in some embodiments; a high degree of deuteration enables or simplifies analytical determination of compounds, in particular in the case of low concentrations.

If one or more of the radicals $R^1$ to $R^3$, $R^{41}$, $R^{42}$, $R^{51}$ and $R^{52}$, called "R" for short in the following definitions, denotes an alkyl radical and/or an alkoxy radical, this may be straight-chain or branched. It is preferably straight-chain, has 2, 3, 4, 5, 6 or 7 carbon atoms and accordingly preferably denotes ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R denotes an alkyl radical in which a CH₂ group has been replaced by —CH═CH—, this may be straight-chain or branched. It is preferably straight-chain and has 2 to 10 carbon atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If R denotes an alkyl radical in which one CH₂ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms. Accordingly, they denote, in particular, acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 2-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R denotes an alkyl radical in which one CH₂ group has been replaced by unsubstituted or substituted —CH═CH— and an adjacent CH₂ group has been replaced by CO or CO—O or O—CO, this may be straight-chain or branched. It is preferably straight-chain and has 4 to 12 carbon atoms. Accordingly, it denotes, in particular, acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If R denotes an alkyl or alkenyl radical which is monosubstituted by CN or $CF_3$, this radical is preferably straight-chain. The substitution by CN or $CF_3$ is in any desired position.

If R denotes an alkyl or alkenyl radical which is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups R may occasionally be of importance owing to better solubility in the conventional liquid-crystalline base materials, but in particular as chiral dopants if they are optically active. Smectic compounds of this type are suitable as components of ferroelectric materials Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy and 1-methylheptoxy.

If R represents an alkyl radical in which two or more $CH_2$ groups have been replaced by —O— and/or —CO—O—, this may be straight-chain or branched. It is preferably branched and has 3 to 12 carbon atoms. Accordingly, it denotes, in particular, biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)pentyl.

The compounds of the formula I are preferably selected from the compounds of the sub-formulae I-1 to I-5, I-1
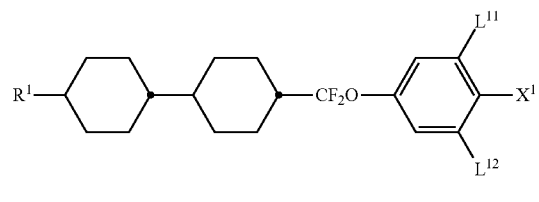

I-2
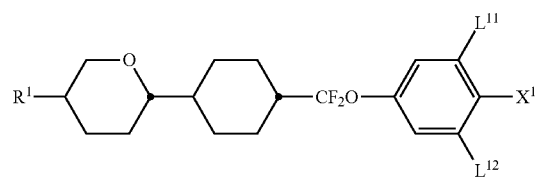

I-3
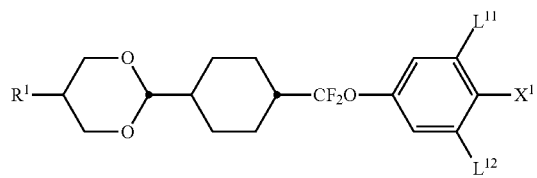

I-4
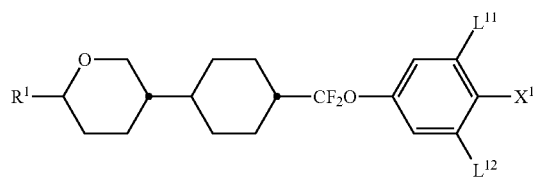

I-5
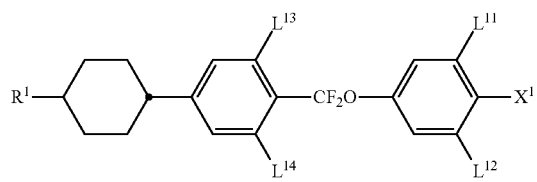

in which the parameters have the meanings indicated under formula I and $L^{13}$ and $L^{14}$, independently of one another, denote H or F and preferably $R^1$ denotes n-alkyl having up to 7 C atoms, $X^1$ denotes F, Cl, halogenated alkyl or halogenated alkoxy having up to 6 C atoms, $L^{11}$ to $L^{14}$ each, independently of one another, denote H or F.

$X^1$ is particularly preferably F, Cl, $CF_3$, $OCF_3$ or $OCHF_2$.

In a particularly preferred embodiment, the compounds of the formula I are selected from the compounds of the formulae I-1a to I-1d, I-1a
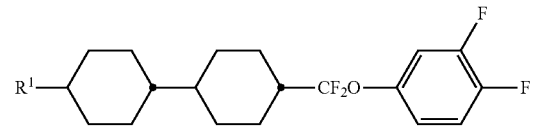

I-1b
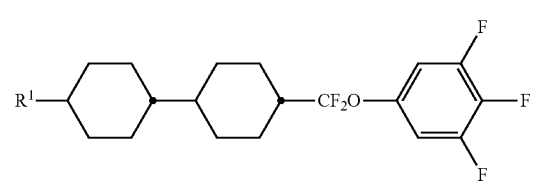

I-1c
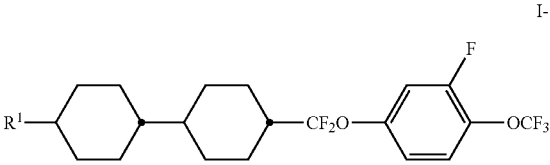

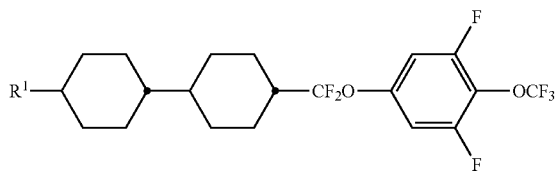

in which R¹ denotes n-alkyl having 1 to 7 C atoms.

The medium very particularly preferably comprises at least one compound of the formula I-1b.

In a further preferred embodiment, the media according to the invention comprise one or more compounds selected from the group of the compounds of the formulae IA and IB,

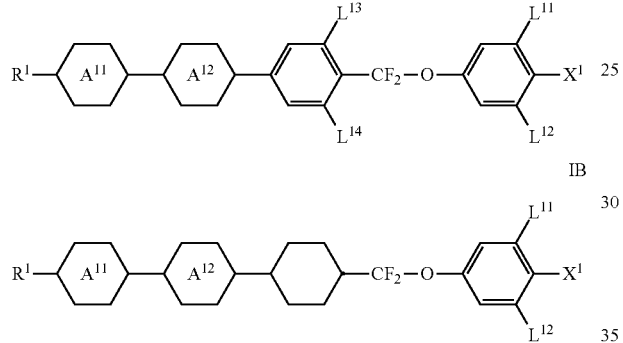

in which the parameters have the meanings indicated under formula I and preferably R¹ denotes n-alkyl having up to 7 C atoms, X¹ denotes F, Cl, halogenated alkyl or halogenated alkoxy having up to 6 C atoms, L¹¹ to L¹⁴ each, independently of one another, denote H or F.

X¹ is particularly preferably F, Cl, $CF_3$, $OCF_3$ or $OCHF_2$.

The compounds of the formula IA are preferably selected from the following sub-formulae IA-1 to IA-7, particularly preferably from the compounds of the formula IA-1,

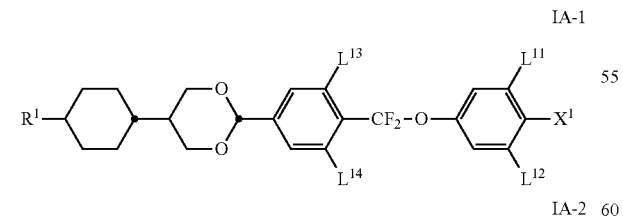

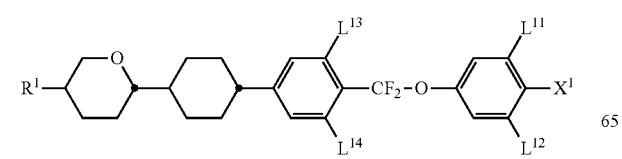

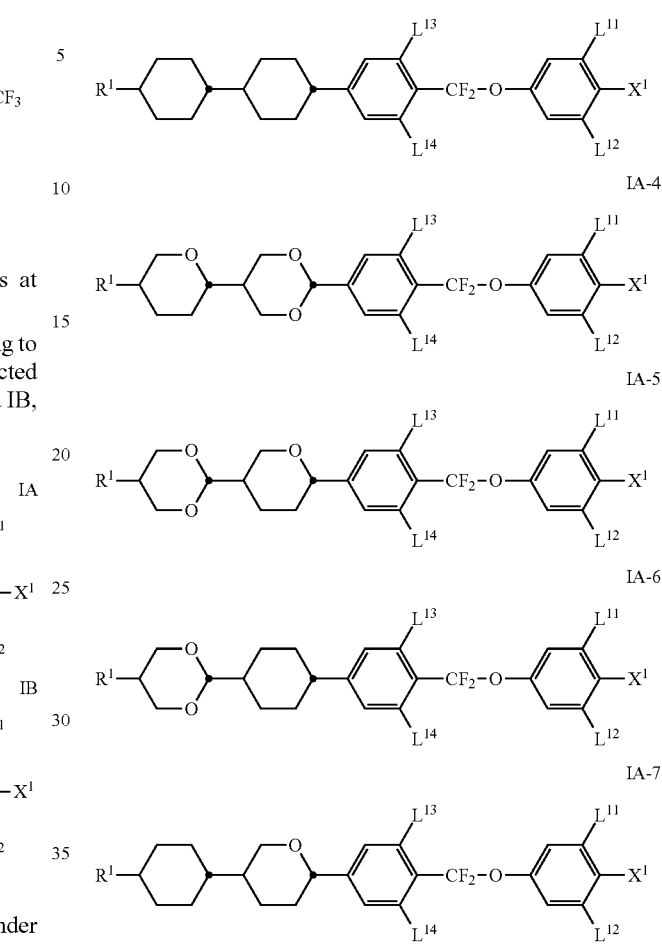

where the parameters have the meanings indicated above.

The compounds of the formula IA are particularly preferably selected from the compounds of the formulae IA-1a to IA-1d, IA-1d

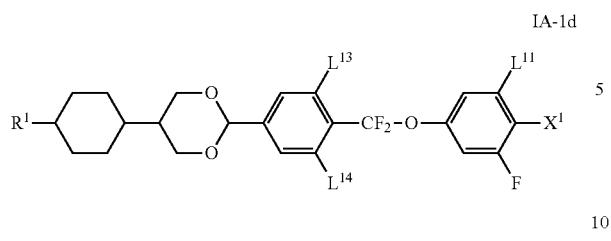

in which $R^1$ has the meaning indicated above and $X^1$ preferably denotes F or $OCF_3$.

Very particular preference is given to the compounds of the formula IA-1d.

Particularly preferred compounds of the formula IB are selected from the compounds of the formula IB-1,

IB-1

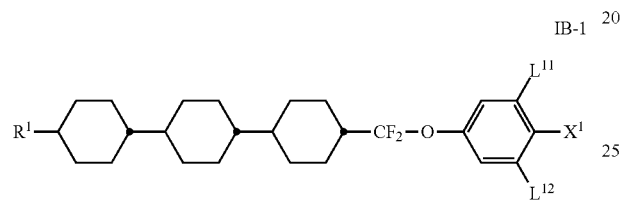

in which the parameters have the meanings indicated above, and preferably at least one of the radicals $L^{11}$ and $L^{12}$ denotes F and $X^1$ denotes F, Cl, $CF_3$ or $OCF_3$.

The compounds of the formula II are preferably selected from the compounds of the sub-formulae II-1 to II-14,

II-1, II-2, II-3, II-4

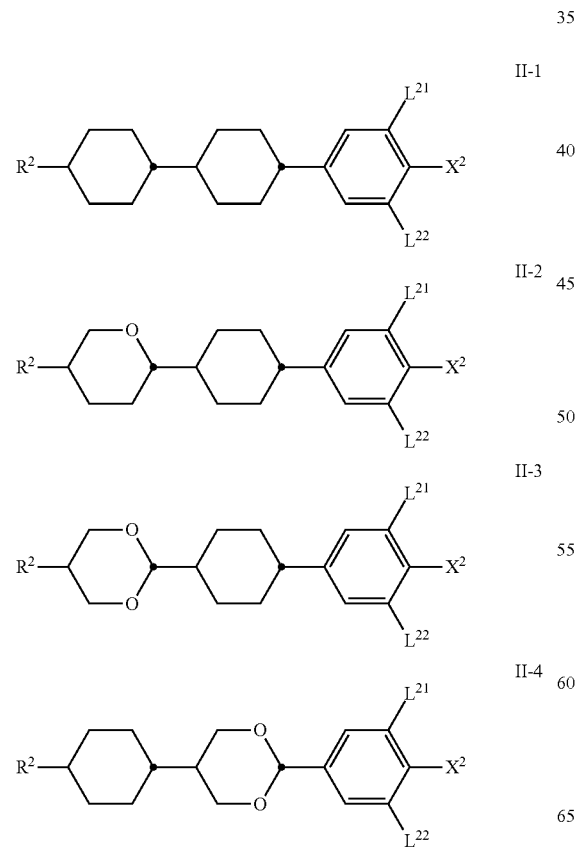

II-5

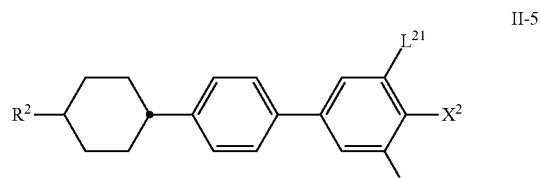

II-6

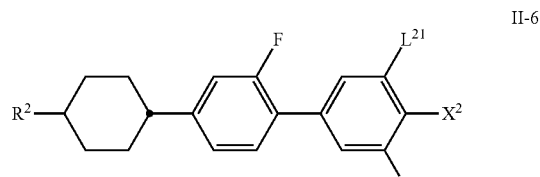

II-7

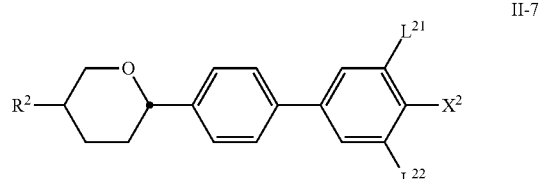

II-8

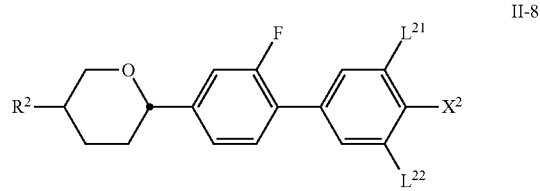

II-9

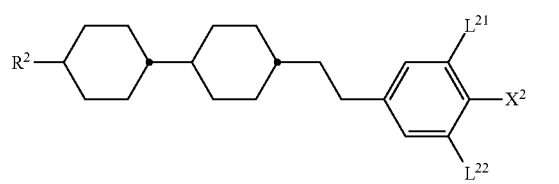

II-10

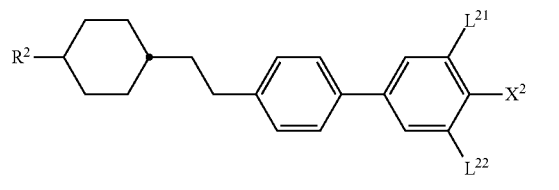

II-11

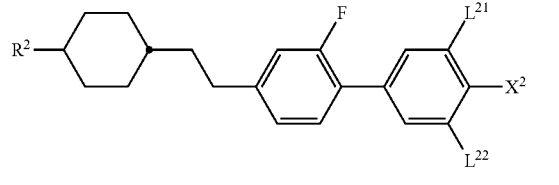

II-12

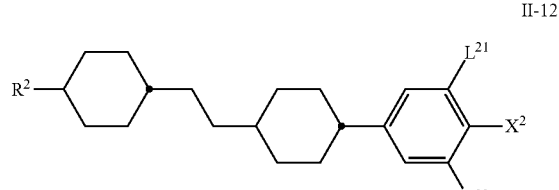

-continued

II-13

[chemical structure: R²—cyclohexyl—phenyl—CH₂CH₂—phenyl(L²¹)(L²²)—X²]

II-14

[chemical structure: R²—cyclohexyl—phenyl(F)—CH₂CH₂—phenyl(L²¹)(L²²)—X²]

in which the parameters have the meanings indicated under formula II and preferably R² denotes n-alkyl having up to 7 C atoms, X² denotes F, Cl, halogenated alkyl or halogenated alkoxy having up to 6 C atoms, and at least one of the radicals L²¹ and L²² denotes F.

X¹ is particularly preferably F, Cl, $CF_3$, $OCF_3$ or $OCHF_2$.

The medium according to the invention particularly preferably comprises one or more compounds selected from the compounds of the formulae II-1, II-5, II-9 and II-12, very particularly preferably selected from the sub-formulae II-1a, II-1b, II-5a to II-5d, II-9a, II-9b, II-12a and II-12b, II-1a

[chemical structure: R²—cyclohexyl—cyclohexyl—phenyl(F)(F)]

II-1b

[chemical structure: R²—cyclohexyl—cyclohexyl—phenyl(F)(F)(F)]

II-5a

[chemical structure: R²—cyclohexyl—phenyl—phenyl(F)(F)]

II-5b

[chemical structure: R²—cyclohexyl—phenyl—phenyl(F)(F)(F)]

II-5c

[chemical structure: R²—cyclohexyl—phenyl(F)—phenyl(F)(F)]

II-5d

[chemical structure: R²—cyclohexyl—phenyl(F)—phenyl(F)(F)(F)]

II-9a

[chemical structure: R²—cyclohexyl—cyclohexyl—CH₂CH₂—phenyl(F)(F)]

II-9b

[chemical structure: R²—cyclohexyl—cyclohexyl—CH₂CH₂—phenyl(F)(F)(F)]

II-12a

[chemical structure: R²—cyclohexyl—CH₂CH₂—cyclohexyl—phenyl(F)(F)]

II-12b

[chemical structure: R²—cyclohexyl—CH₂CH₂—cyclohexyl—phenyl(F)(F)(F)]

in which R² has the meaning indicated above and preferably denotes n-alkyl having 1 bis 7 C atoms.

The medium very particularly preferably comprises one or more compounds selected from the group of the compounds of the formulae II-1b, II-5a, II-5b and II-9a.

In a preferred embodiment, the medium comprises one or more compounds of the general formula III,

III

[chemical structure: R³—A³¹—[A³²—Z³]₂—phenyl(L³¹)(L³²)—X³]

in which

R³ has the meaning indicated for R² above under formula II,

[chemical structures: —A³¹— and —A³²—] and on each occurrence, independently of one another, denote

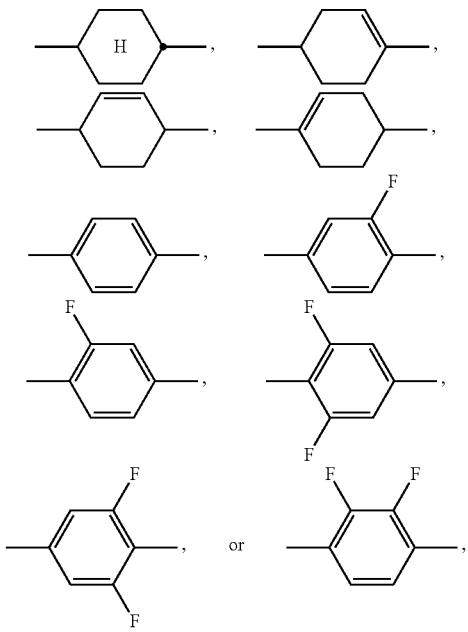

preferably one or more of

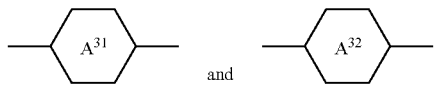

and denotes

L$^{31}$ and L$^{32}$, independently of one another, denote H or F,

X$^3$ denotes F, Cl, CN, a halogenated alkyl radical, a halogenated alkenyl radical, a halogenated alkoxy radical or a halogenated alkenyloxy radical having up to 6 C atoms, Z$^3$ on each occurrence, independently of one another, denotes —CH$_2$CH$_2$—, —COO—, trans —CH=CH—, trans —CF=CF—, —CH$_2$O—, —C≡C— or a single bond, preferably one or both denote a single bond.

The compounds of the formula III are preferably selected from the group of the compounds of the formulae III-1 to III-9:

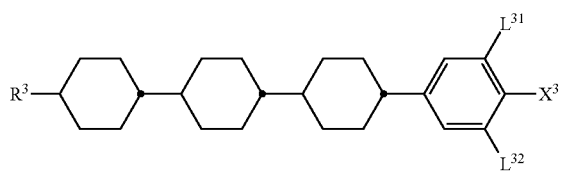

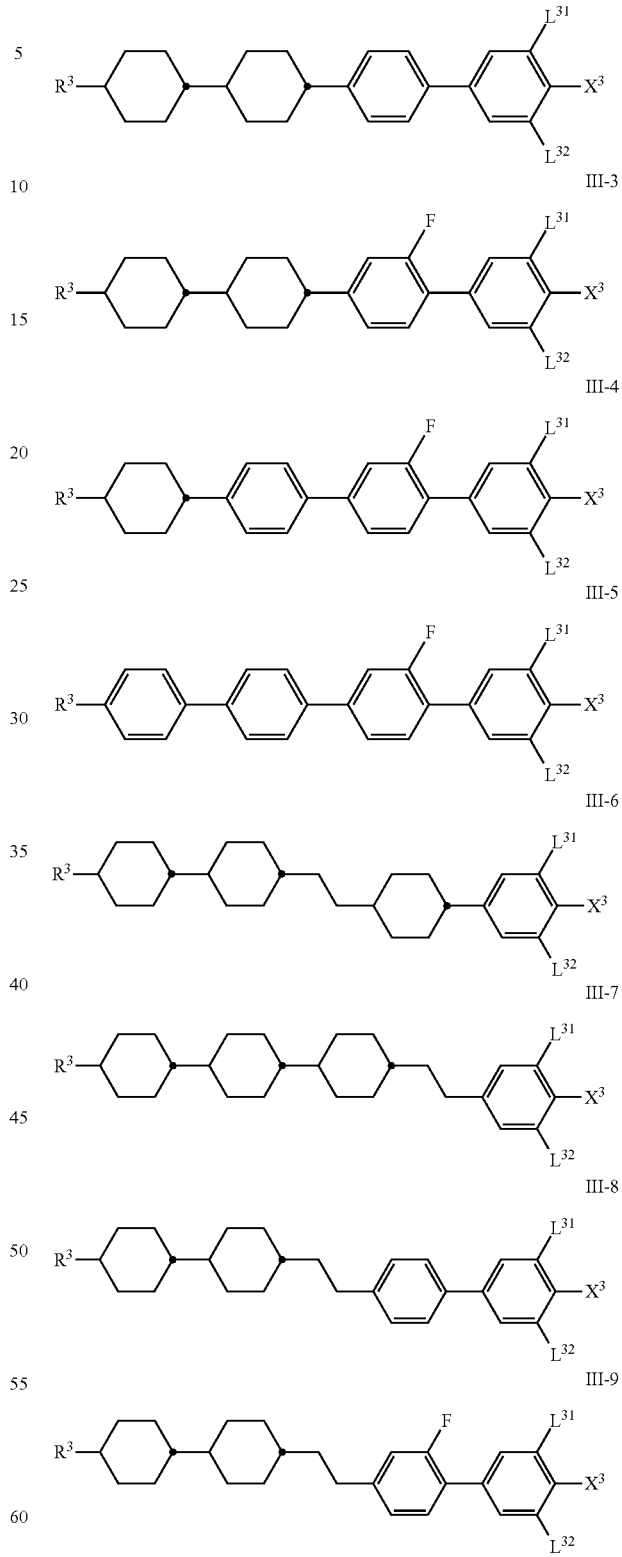

in which
L$^{31}$ and L$^{32}$, independently of one another, denote H or F,
X$^3$ denotes F, Cl, halogenated alkyl or halogenated alkoxy having up to 6 C atoms and preferably denotes F or OCF$_3$.

The medium particularly preferably comprises one or more compounds selected from the group of the compounds of the formulae III-1 and III-3.

The medium very particularly preferably comprises one or more compounds of the following sub-formulae:

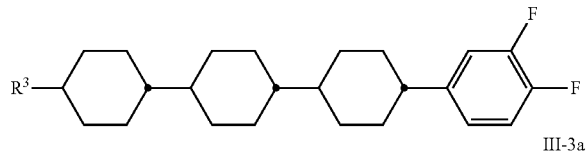

III-1a

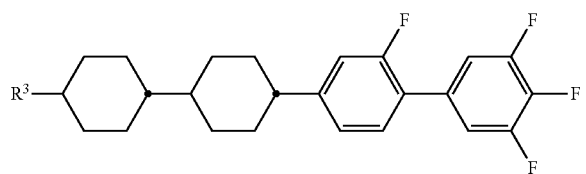

III-3a in which $R^3$ preferably denotes n-alkyl having 1 to 7 C atoms.

The medium according to the invention preferably comprises one or more compounds of the formula IV,

IV in which
$R^{41}$ and $R^{42}$, independently of one another, have the meaning indicated for $R^2$ above under formula II, preferably $R^{41}$ denotes alkyl and $R^{42}$ denotes alkyl or alkoxy or $R^{41}$ denotes alkenyl and $R^{42}$ denotes alkyl,

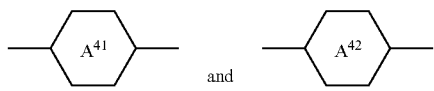

and on each occurrence, independently of one another, denote

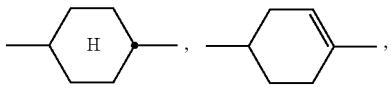

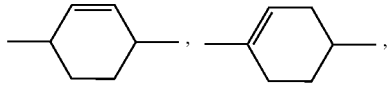

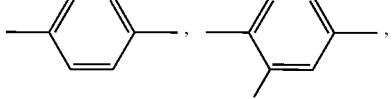

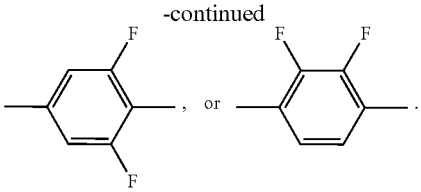

preferably one or more of

and denote(s)

$Z^{41}$ and $Z^{42}$ on each occurrence, independently of one another, denote —CH$_2$CH$_2$—, —COO—, trans —CH=CH—, trans —CF=CF—, —CH$_2$O—, —CF$_2$O—, —C≡C— or a single bond, preferably one or more thereof denote(s) a single bond, and p denotes 0, 1 or 2, preferably 0 or 1.

The compounds of the formula IV are preferably selected from the group of the compounds of the formulae IV-1 to IV-13,

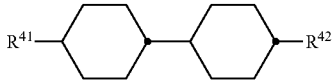

IV-1

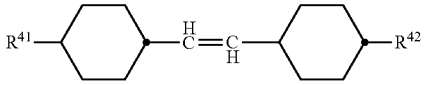

IV-2

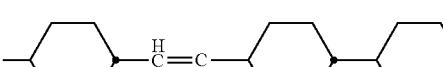

IV-3

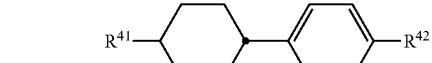

IV-4

IV-5

IV-6

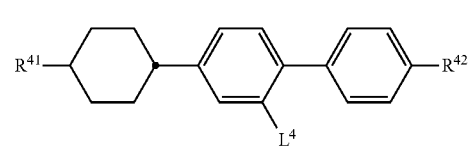

IV-7

-continued

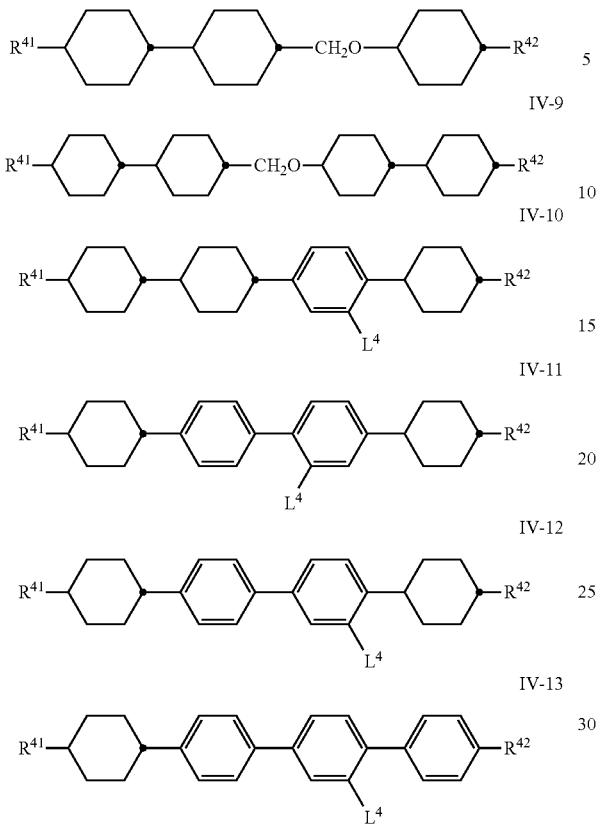

in which
R⁴¹ and R⁴², independently of one another, denote n-alkyl having 1 to 7 C atoms and
L⁴ denotes H or F, preferably F.

The medium according to the invention particularly preferably comprises one or more compounds selected from the group of the compounds of the formulae IV-5, IV-8 and IV-11.

In a further preferred embodiment, the medium according to the invention comprises one or more compounds of the formula V,

in which
R⁵¹ and R⁵², independently of one another, have the meaning indicated for R² above under formula II, preferably R⁶¹ denotes alkyl and R⁶² denotes alkyl or alkenyl,

on each occurrence, independently of one another, denotes

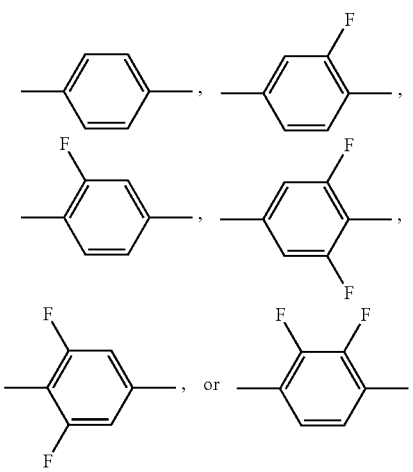

preferably one or more of

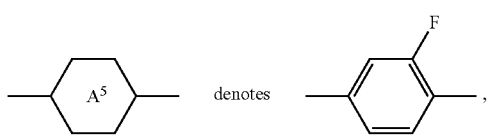

Z⁵¹ and Z⁵², independently of one another and, if Z⁵¹ occurs twice, also these independently of one another, denote —CH₂CH₂—, —COO—, trans —CH=CH—, trans —CF=CF—, —CH₂O— or a single bond, preferably one or more thereof denote(s) a single bond, and
r denotes 0, 1 or 2, preferably 1 or 2, particularly preferably 1.

In a further preferred embodiment, the medium comprises one or more compounds selected from the group of the compounds of the formulae V-1 and V-2,

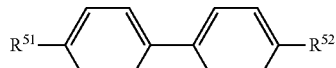

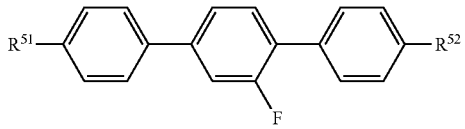

in which R⁵¹ and R⁵² have the respective meanings indicated above under formula V and preferably denote alkyl.

The compounds of the formulae I to V are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se, which are not mentioned in greater detail here.

The compounds of the formulae I and IA are known, for example, from DE 10 2008 062858 A1. The compounds of the formula IB are disclosed in DE 102223061 A1.

The invention furthermore also relates to electro-optical components, in particular light valves, based on the TN or STN effect, having two plane-parallel outer plates, which, with a frame, form a cell, integrated non-linear elements for switching individual pixels on the outer plates, and a nematic liquid-crystal mixture having positive dielectric anisotropy and high specific resistance located in the cell, which contain media according to the invention, and to the use of these media for electro-optical purposes.

The invention furthermore relates to the use thereof in lighting devices for motor vehicles and in liquid-crystal displays, in particular TN, STN or MLC displays.

The invention furthermore relates to lighting devices for motor vehicles and to electro-optical displays which contain these components.

The liquid-crystal mixtures according to the invention enable a significant broadening of the available parameter space. The achievable combinations of clearing point, phase width, viscosity at low temperature, thermal and UV stability and dielectric anisotropy are far superior to previous materials from the prior art.

It goes without saying that, through a suitable choice of the components of the mixtures according to the invention, it is also possible for higher clearing points (for example above 150° C.) to be achieved at higher threshold voltages or lower clearing points to be achieved at lower threshold voltages with retention of the other advantageous properties. At viscosities correspondingly increased only slightly, it is likewise possible to obtain mixtures having greater Δε and thus low thresholds. The electro-optical components according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the component using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I, IA and IB exhibit a significantly smaller decrease in the HR with increasing temperature than analogous mixtures comprising cyanophenylcyclohexanes of the formula

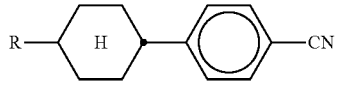

or esters of the formula

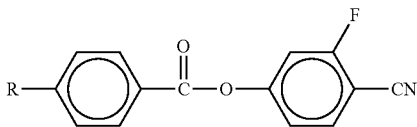

instead of the compounds of the formulae I, IA and IB.

The UV stability of the mixtures according to the invention is also considerably better, i.e. they exhibit a significantly smaller decrease in the HR on exposure to UV.

The liquid-crystal mixtures according to the invention, while retaining the nematic phase down to −20° C. and preferably down to −30° C., particularly preferably down to −40° C., enable a clearing point above 120° C., preferably above 130° C., particularly preferably above 140° C., at the same time dielectric anisotropy values $\Delta\varepsilon \geq 6$, preferably $\geq 8$, and a high value for the specific resistance to be achieved, enabling excellent light valves according to the invention to be obtained. In particular, the mixtures are characterised by low operating voltages. The TN thresholds are below 2.0 V, preferable below 1.5 V, particularly preferably <1.3 V.

The liquid-crystal mixtures according to the invention have an optical anisotropy (Δn) in the range from 0.050 to 0.110 auf, preferably from 0.060 to 0.100, particularly preferably 0,080 to 0,090.

The rotational viscosity $\gamma_1$ of the mixtures according to the invention at 20° C. is preferably <350 mPa·s, particularly preferably <300 mPa·s. The nematic phase range is preferably at least 140 K, in particular at least 180 K. This range preferably extends at least from −40° to +140°.

Preferred embodiments are indicated below:

The medium comprises one or more compounds of the formula I in a total concentration in the range from 40 to 70%, preferably from 40 to 60%, particularly preferably from 40 to 50%.

The total concentration of compounds of the formula II in the medium is 18% to 50%, preferably 23% to 45% and particularly preferably 30% to 40%.

The medium comprises one or more compounds of the formula II-1b in a total concentration of 10% to 35%, preferably 12% to 30%, particularly preferably 15% to 25%.

The total concentration of the compounds of the formulae IV-1, IV-2, IV-3, IV-4, IV-5 and IV-6 in the medium is 3% to 20%, preferably 5% to 18%, particularly preferably 8% to 16%. The medium preferably comprises at least one compound of the formula IV-5.

The total concentration of compounds of the formulae IV-7, IV-8, IV-9, IV-10, IV-11, IV-12 and IV-13 is 2% to 20%, preferably 4% to 16% and particularly preferably 6% to 13%. The medium preferably comprises at least one compound of the formula IV-8 or IV-11.

The medium comprises one or more compounds selected from the group of the compounds CCGU-n-F, CCCG-n-F, CCCQU-n-F, CCCQU-n-OT and CDUQU-n-F (the meaning of the acronyms is given in Tables A and B shown below).

The proportion of the compounds containing unsaturated side chains (i.e. R denotes alkenyl or alkynyl) in the medium is 0 to 10%, preferably 0 to 5%, particularly preferably 0 to 2%.

It has been found that the liquid-crystal mixtures according to the invention using one or more compounds selected from the compounds of the formulae IA, IB and I to V result in lower values for the birefringence compared with the prior art, with at the same time broad nematic phases, high clearing points and low smectic-nematic transition temperatures being observed, causing an improvement in the storage stability. Particular preference is given to mixtures which, besides one or more compounds of the formulae I, IA and IB, comprise one or more compounds of the formula II, in particular compounds of the formula II-1b. All the said compounds are colourless, stable and readily miscible with one another and with other liquid-crystal materials.

The optimum mixing ratio of the compounds of the formulae I, IA, IB and II to V depends substantially on the desired properties, on the choice of the components of the formulae I, IA, IB and II to V and on the choice of any other components that may be present.

Suitable mixing ratios within the range given above can easily be determined from case to case.

The total amount of compounds of the formulae I, IA, IB and II to V in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae I, IA, IB, II and III. Furthermore, the clearing point is higher, the greater the proportion of compounds of the formulae IA, IB, III and IV The construction of the light valves according to the invention from polarisers, electrode base plates and surface-treated electrodes corresponds to the usual design of components of this type. The term "usual design" is broadly drawn here and also encompasses all derivatives and modifications of the components, in particular also matrix display elements based on poly-Si TFTs or MIMs.

However, a significant difference between the liquid-crystal light valves according to the invention and the hitherto conventional displays based on the twisted nematic cell consists in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15% of pleochroic dyes or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing direction perpendicular to the plate surface). $t_{on}$ denotes the switch-on time and $t_{off}$ the switch-off time at an operating voltage corresponding to 2.0 times the value of $V_{10}$. $\Delta n$ denotes the optical anisotropy and $n_o$ denotes the refractive index. $\Delta\varepsilon$ denotes the dielectric anisotropy ($\Delta\varepsilon=\varepsilon_\parallel-\varepsilon_\perp$, where $\varepsilon_\parallel$ denotes the dielectric constant parallel to the longitudinal molecular axes and $\varepsilon_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$, $L^{2*}$ and $L^{3*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ | $L^{3*}$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

Preferred mixture components can be found in Tables A and B.

TABLE A

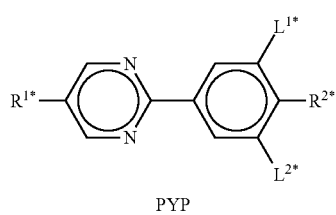

PYP

TABLE A-continued
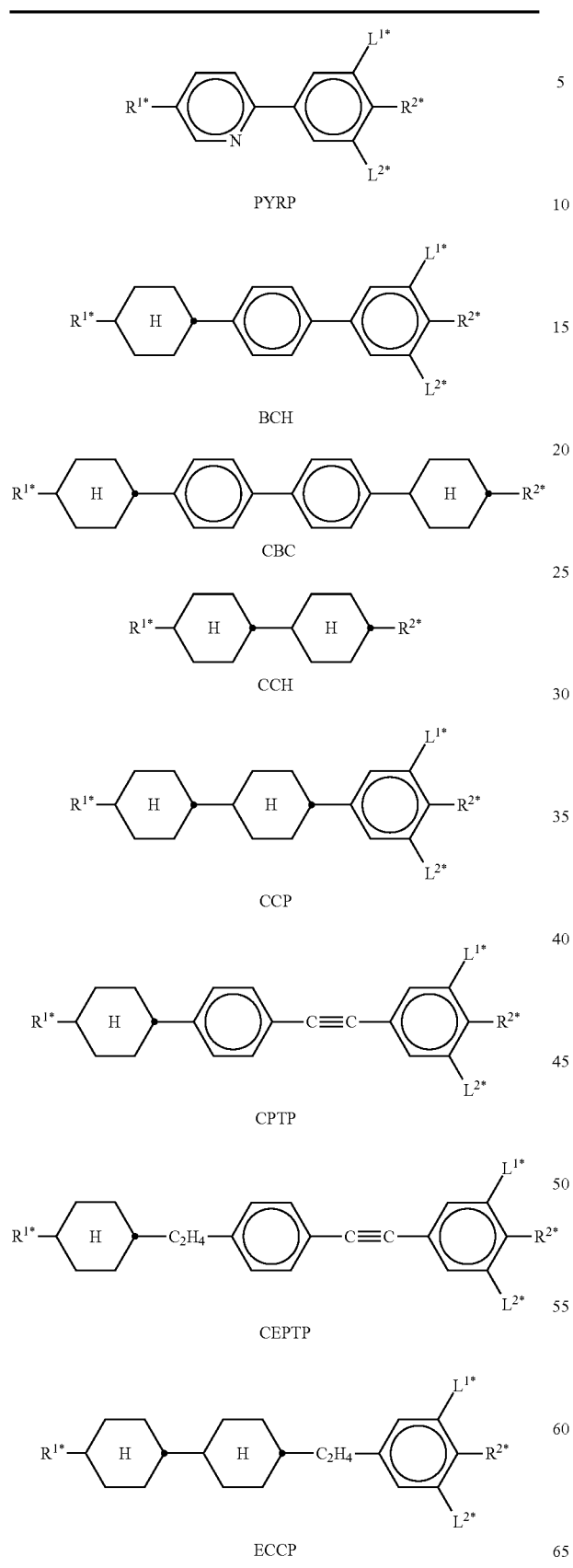
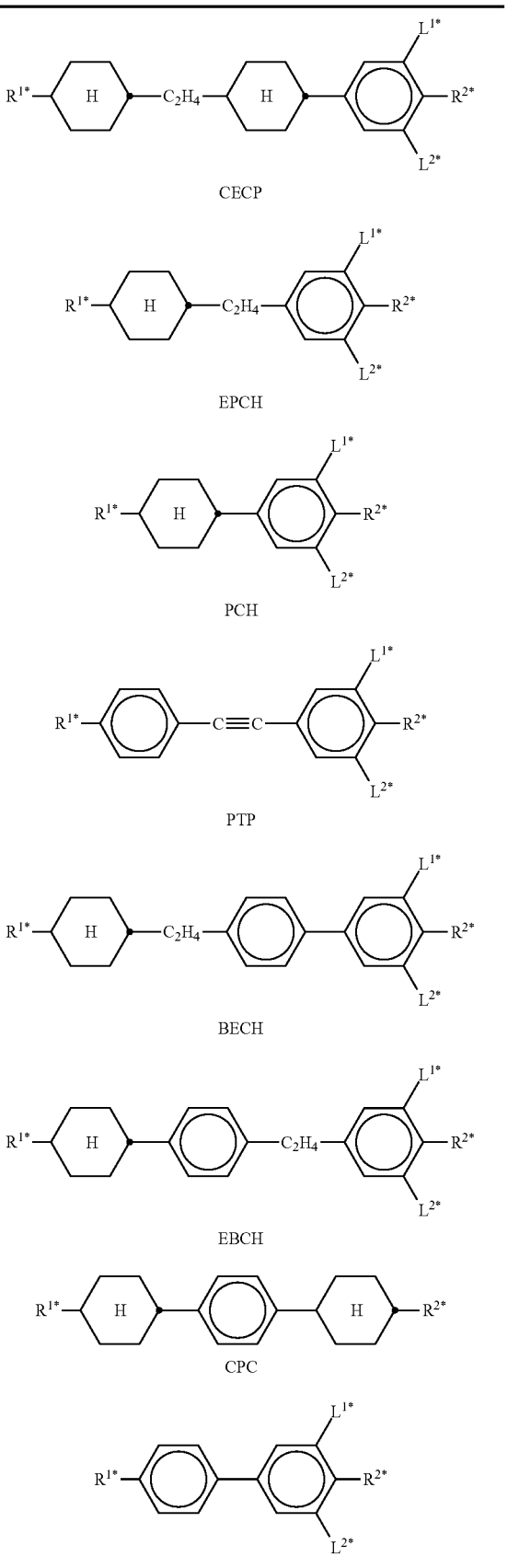

TABLE A-continued
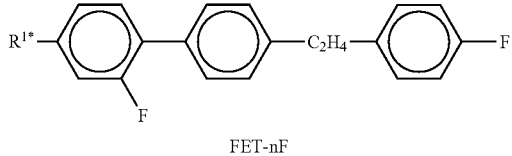
FET-nF
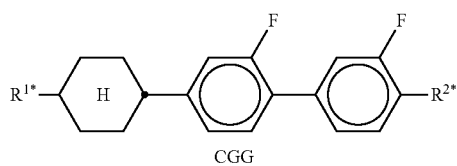
CGG
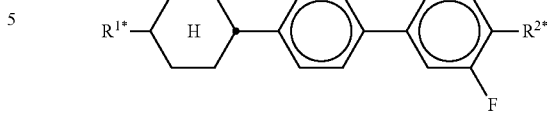
CGU
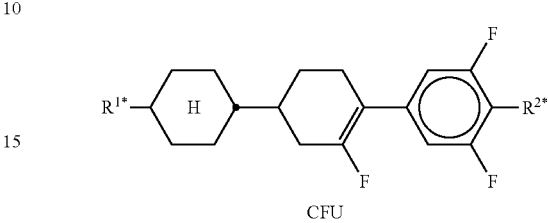
CFU
TABLE B
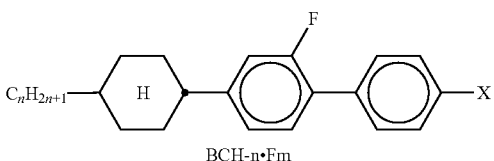
BCH-n·Fm
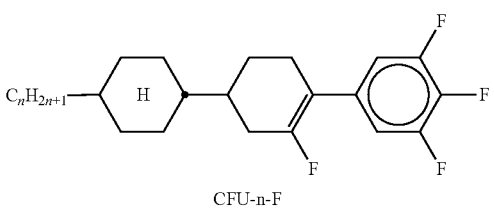
CFU-n-F
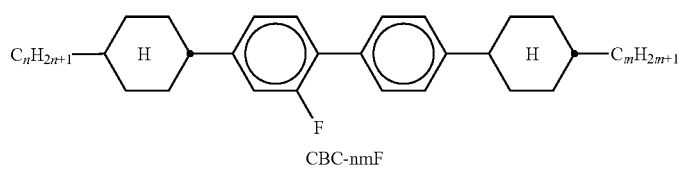
CBC-nmF
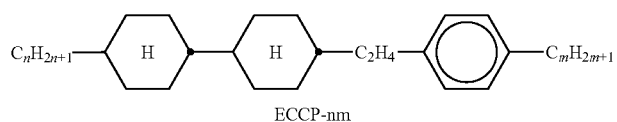
ECCP-nm
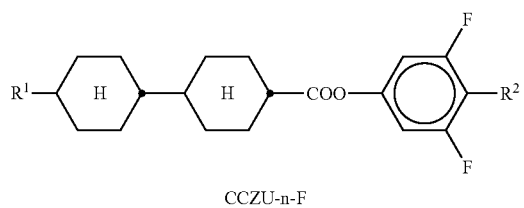
CCZU-n-F
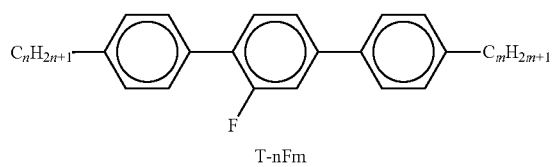
T-nFm TABLE B-continued
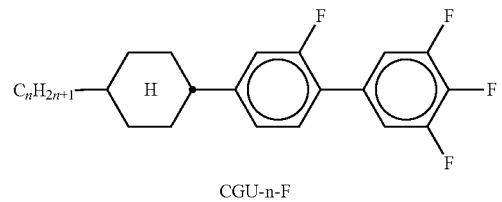
CGU-n-F
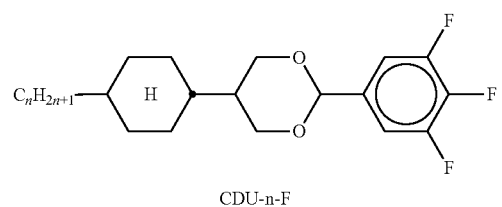
CDU-n-F
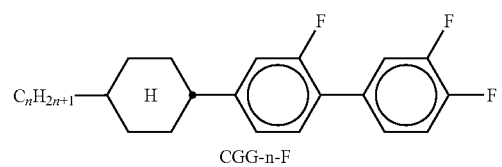
CGG-n-F
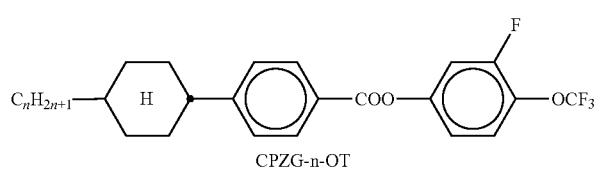
CPZG-n-OT
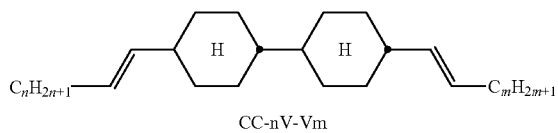
CC-nV-Vm
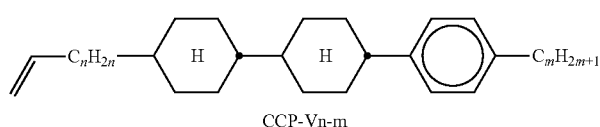
CCP-Vn-m
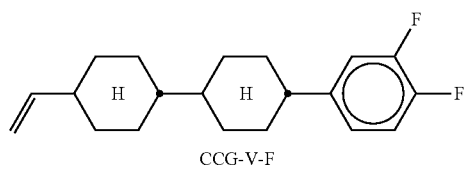
CCG-V-F
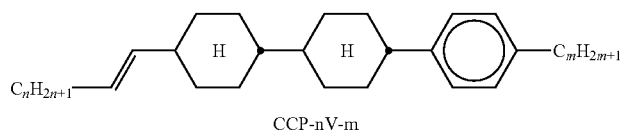
CCP-nV-m
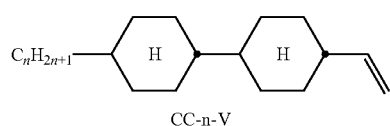
CC-n-V
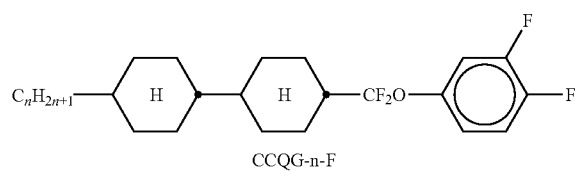
CCQG-n-F TABLE B-continued
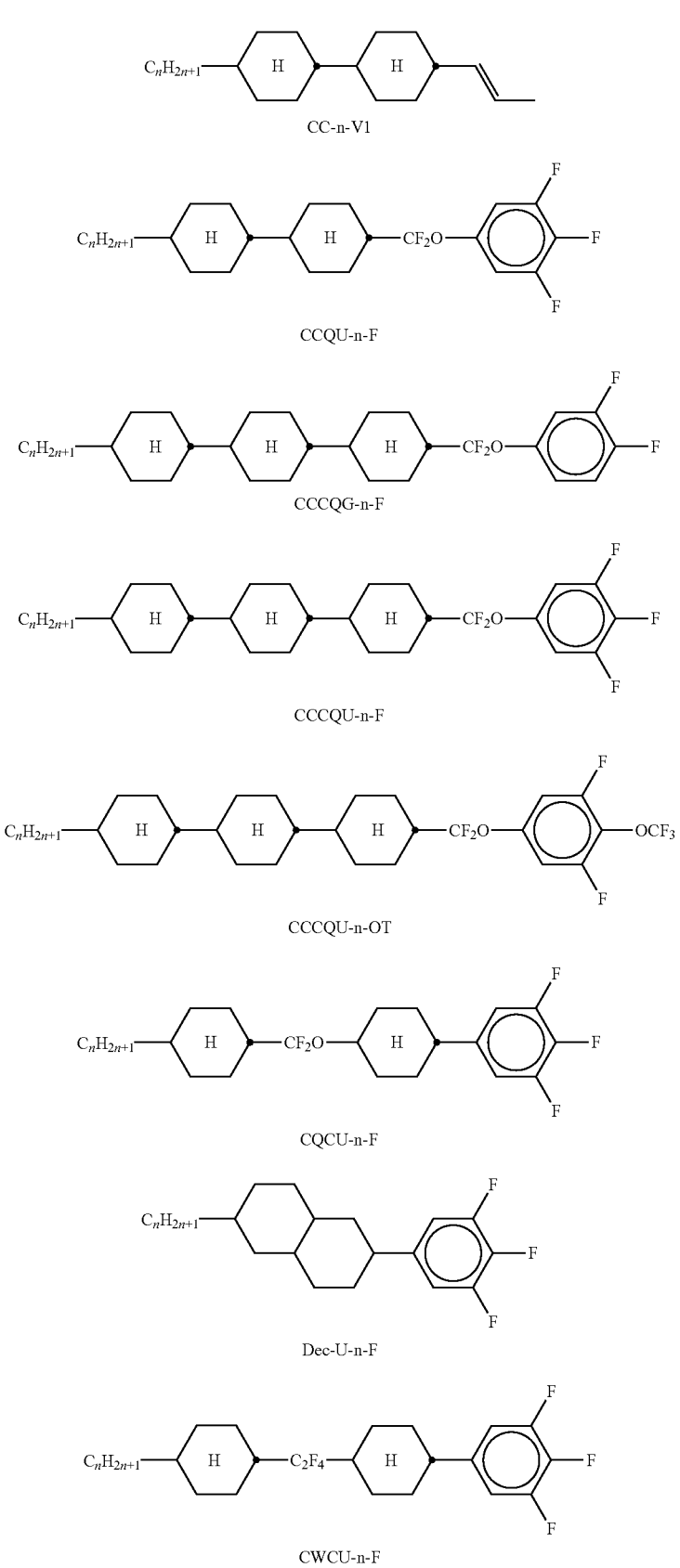

TABLE B-continued
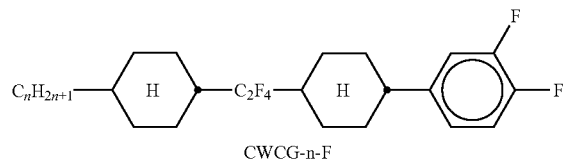
CWCG-n-F
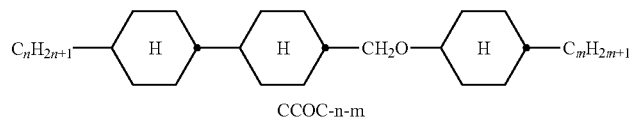
CCOC-n-m
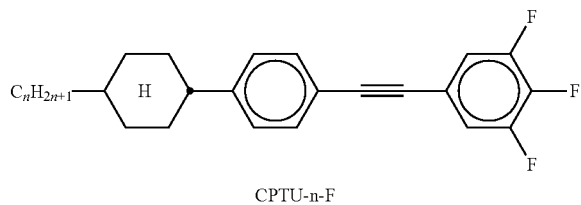
CPTU-n-F
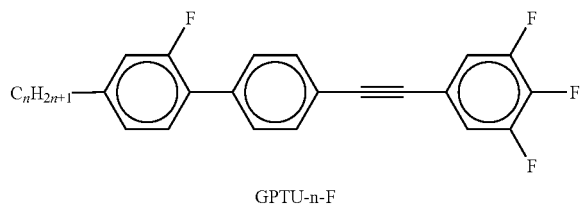
GPTU-n-F
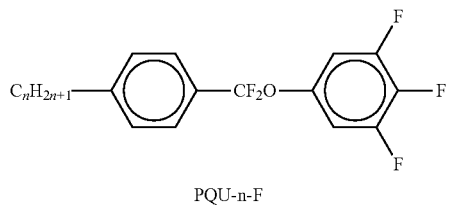
PQU-n-F
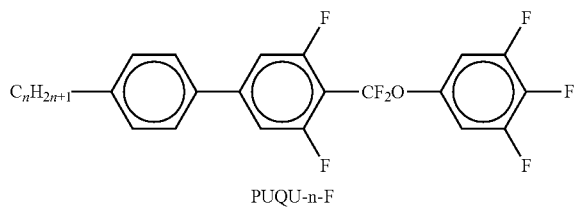
PUQU-n-F
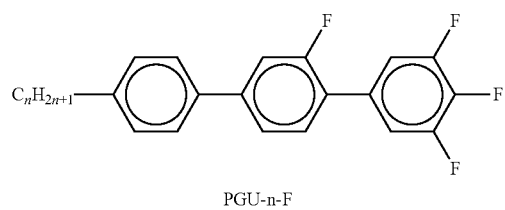
PGU-n-F
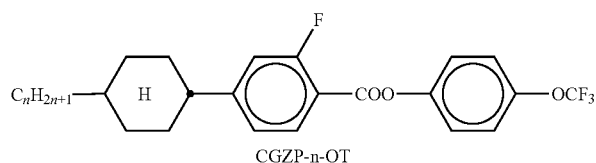
CGZP-n-OT TABLE B-continued
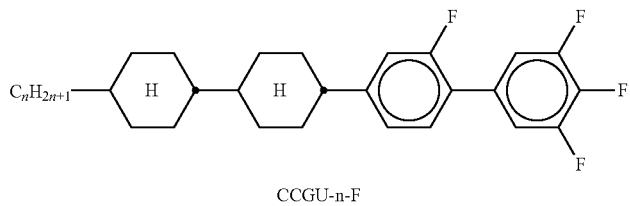
CCGU-n-F
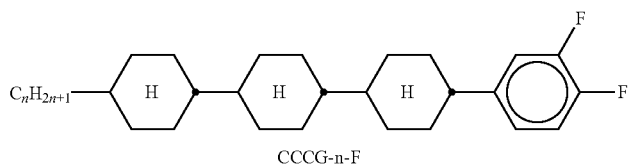
CCCG-n-F
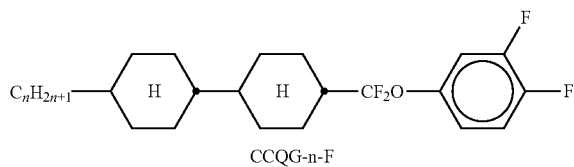
CCQG-n-F
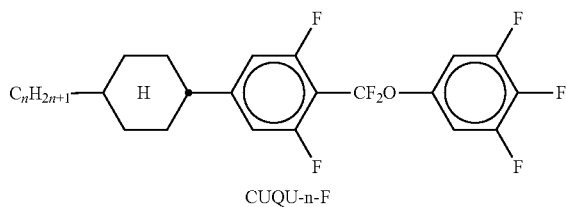
CUQU-n-F
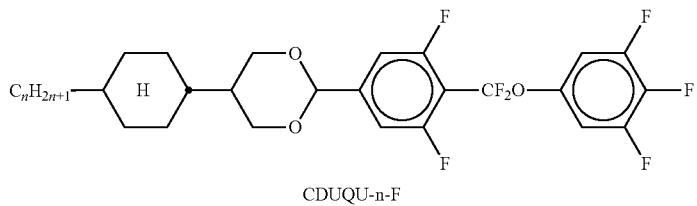
CDUQU-n-F
Particular preference is given to liquid-crystalline mixtures which, besides the compounds of the formulae I and IA, comprise at least one, two, three or four compounds from Table B.
Table C shows possible dopants which are generally added to the mixtures according to the invention.
TABLE C
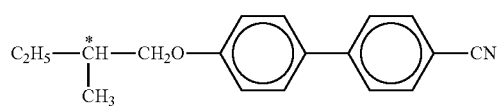
C 15
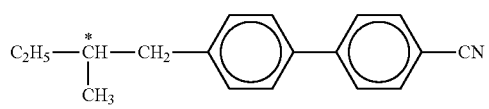
CB 15
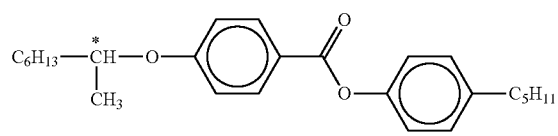
CM 21

TABLE C-continued

| Structure | Label |
|---|---|
| C₆H₁₃O–⟨phenyl⟩–C(O)O–⟨phenyl⟩–C(O)O–*CH(CH₃)–C₆H₁₃ | R/S-811 |
| C₃H₇–⟨H⟩–⟨H⟩–⟨phenyl⟩–CH₂–*CH(CH₃)–C₂H₅ | CM 44 |
| C₅H₁₁–⟨phenyl⟩–⟨phenyl⟩–C(O)O–*CH(C₂H₅)–phenyl | CM 45 |
| C₈H₁₇O–⟨phenyl⟩–⟨phenyl⟩–C(O)O–*CH(C₂H₅)–phenyl | CM 47 |
| C₅H₇–⟨H⟩–⟨phenyl⟩–COO–CH₂–*CH(phenyl)–OOC–⟨phenyl⟩–⟨H⟩–C₅H₁₁ | R/S-1011 |
| C₃H₇–⟨H⟩–⟨H⟩–⟨2,3-difluorophenyl⟩–O–*CH(C≡CH)–C₄H₉ (pentyl with terminal alkyne) | R/S-3011 |
| Cholesteryl octanoate (C₈H₁₇C(O)O–cholesteryl) | CN |
| C₃H₇–⟨H⟩–⟨H⟩–⟨2,6-difluorophenyl⟩–O*CH(CH₃)–C₆H₁₃ | R/S-2011 |

Table D below show illustrative compounds which can be used as stabilisers in the media according to the invention.
TABLE D
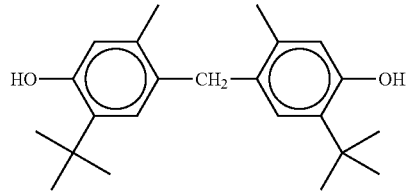
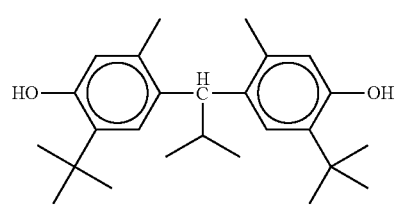
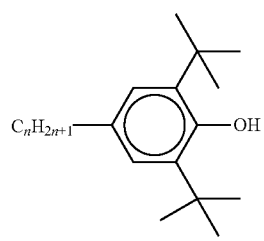
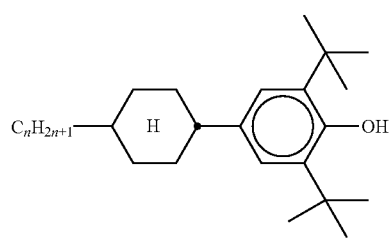
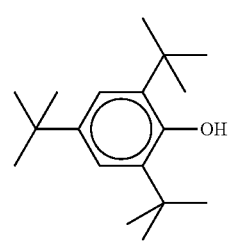
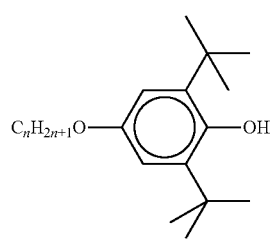
TABLE D-continued
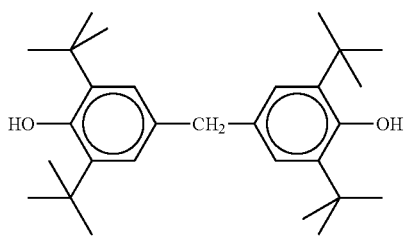
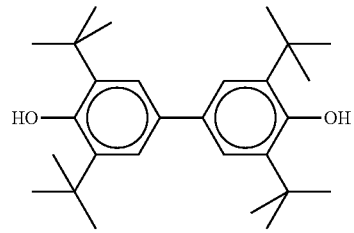
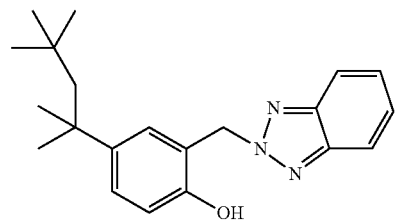 [SMILES: CC(C)(C)CC(C)(C)c1ccc(O)c(Cn2nc3ccccc3n2)c1]
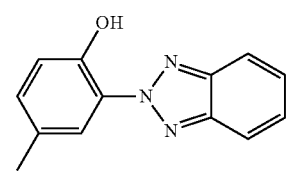 [SMILES: Cc1ccc(O)c(-n2nc3ccccc3n2)c1]
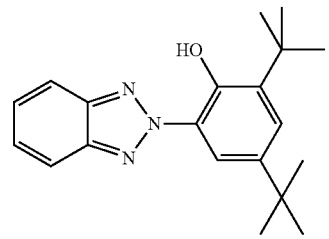 [SMILES: CC(C)(C)c1cc(-n2nc3ccccc3n2)c(O)c(C(C)(C)C)c1]
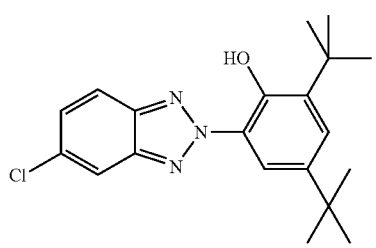 [SMILES: CC(C)(C)c1cc(-n2nc3ccc(Cl)cc3n2)c(O)c(C(C)(C)C)c1]

TABLE D-continued
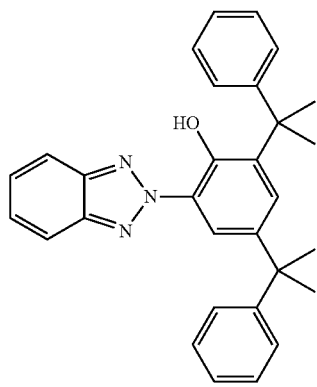 [SMILES: CC(C)(c1ccccc1)c1cc(-n2nc3ccccc3n2)c(O)c(C(C)(C)c2ccccc2)c1]
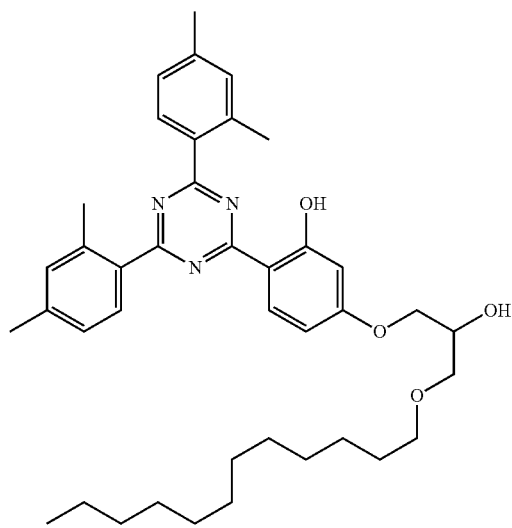
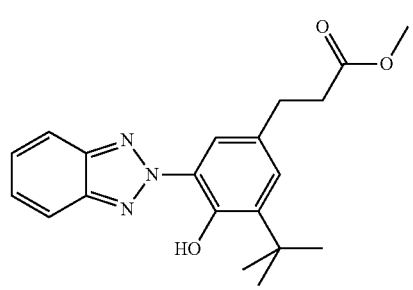 [SMILES: COC(=O)CCc1cc(-n2nc3ccccc3n2)c(O)c(C(C)(C)C)c1]
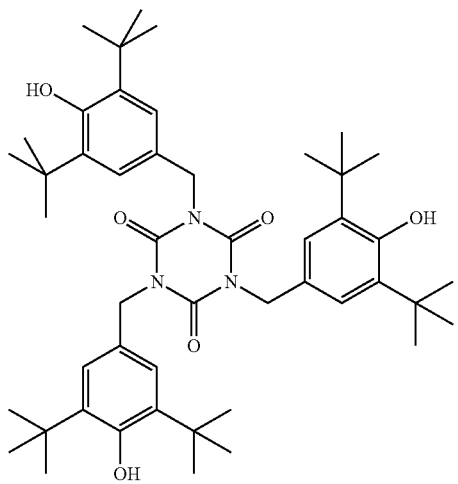
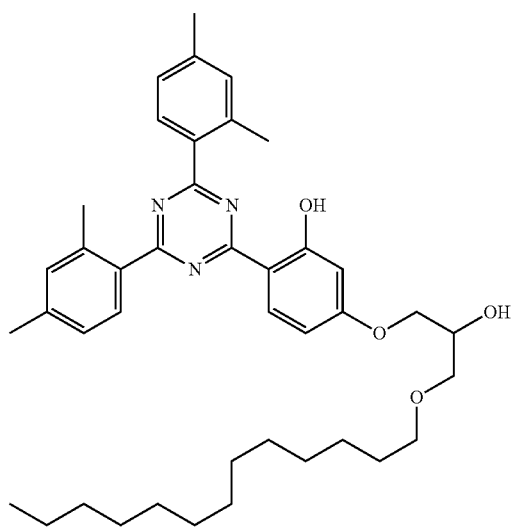 [SMILES: CCCCCCCCCCCCCOCC(O)COc1ccc(-c2nc(-c3ccc(C)cc3C)nc(-c3ccc(C)cc3C)n2)c(O)c1]
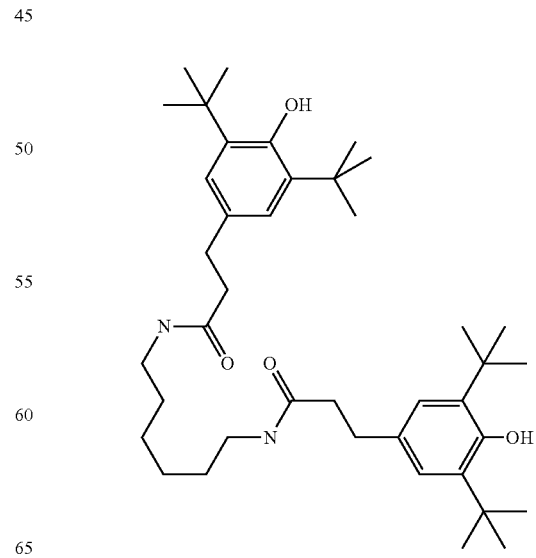

TABLE D-continued

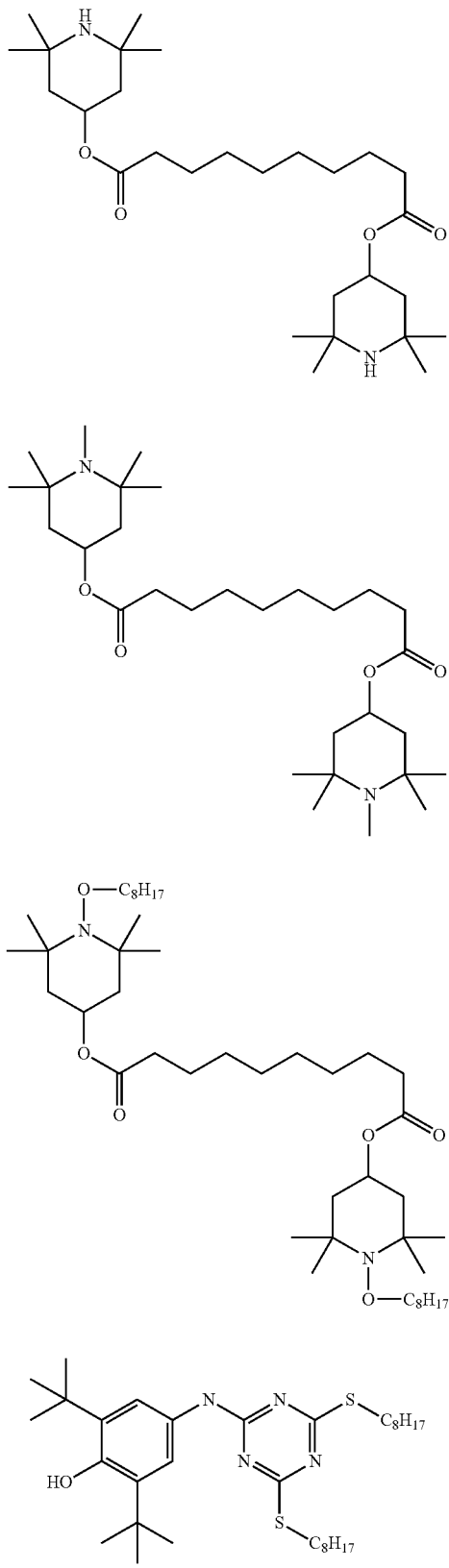

TABLE D-continued

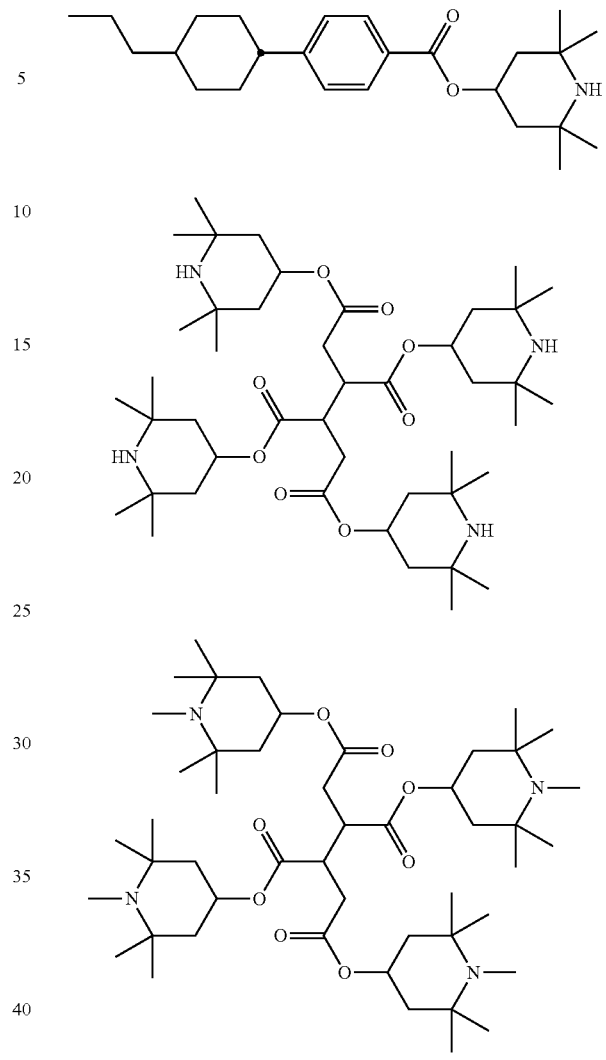

In a preferred embodiment of the present invention, the liquid-crystalline media comprise one or more compounds from Table D.

The following examples are intended to explain the invention without limiting it. Above and below, percentage data denote percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes optical anisotropy (589 nm, 20° C.), the flow viscosity $v_{20}$ (mm$^2$/sec) and the rotational viscosity $\gamma_1$ (mPa·s) were each determined at 20° C.

EXAMPLE M1

| | | | |
|---|---|---|---|
| BCH-3F.F | 7.00% | Clearing point [° C.]: | 122 |
| BCH-5F.F | 10.00% | Δn [589 nm, 20° C.]: | 0.0960 |
| CCP-31 | 10.00% | | |
| CCP-33 | 6.00% | | |
| CCP-3F.F.F | 10.00% | | |
| CCP-5F.F.F | 6.00% | | |

| CBC-53F | 6.00% |
| CCQU-2-F | 15.00% |
| CCQU-3-F | 15.00% |
| CCQU-5-F | 15.00% |

EXAMPLE M2

| | | | |
|---|---|---|---|
| CCQU-2-F | 15.00% | Clearing point [° C.]: | 140 |
| CCQU-3-F | 15.00% | Δn [589 nm, 20° C.]: | 0.0946 |
| CCQU-5-F | 15.00% | Δε [1 kHz, 20° C.]: | 13.8 |
| CCP-3F.F.F | 12.00% | γ₁ [mPa · s, 20° C.]: | 332 |
| CCP-5F.F.F | 6.00% | | |
| CCGU-3-F | 10.00% | | |
| CCP-3-1 | 10.00% | | |
| CBC-53F | 6.00% | | |
| CBC-33F | 3.00% | | |
| CDUQU-3-F | 8.00% | | |

EXAMPLE M3

| | | | |
|---|---|---|---|
| PGP-2-4 | 2.00% | Clearing point [° C.]: | 123 |
| PGP-2-5 | 2.00% | Δn [589 nm, 20° C.]: | 0.0955 |
| BCH-5F.F | 7.00% | | |
| CCP-3F.F.F | 14.00% | | |
| CCP-5F.F.F | 5.00% | | |
| CCQU-2-F | 14.00% | | |
| CCQU-3-F | 16.00% | | |
| CCQU-5-F | 12.00% | | |
| CCP-3-1 | 10.00% | | |
| ECCP-5F.F | 10.00% | | |
| CBC-33F | 4.00% | | |
| CBC-53F | 4.00% | | |

EXAMPLE M4

| | | | |
|---|---|---|---|
| BCH-5F.F | 12.00% | Clearing point [° C.]: | 140 |
| BCH-3F.F.F | 5.00% | Δn [589 nm, 20° C.]: | 0.0946 |
| CCP-31 | 5.00% | | |
| CCP-33 | 5.00% | | |
| CCP-3F.F.F | 15.00% | | |
| CCP-5F.F.F | 7.00% | | |
| CBC-33F | 4.00% | | |
| CBC-53F | 4.00% | | |
| CCQU-2-F | 8.00% | | |
| CCQU-3-F | 20.00% | | |
| CCQU-5-F | 15.00% | | |

EXAMPLE M5

| | | | |
|---|---|---|---|
| BCH-5F.F | 10.00% | Clearing point [° C.]: | 140 |
| CCP-3F.F.F | 14.00% | Δn [589 nm, 20° C.]: | 0.0946 |
| CCP-5F.F.F | 6.00% | | |
| CCQU-2-F | 14.00% | | |
| CCQU-3-F | 16.00% | | |
| CCQU-5-F | 12.00% | | |
| CCGU-3-F | 7.00% | | |
| CCP-3-1 | 8.00% | | |
| ECCP-5F.F | 8.00% | | |

| CBC-33F | 2.00% |
| CBC-53F | 3.00% |

EXAMPLE M6

| | | | |
|---|---|---|---|
| CCQU-2-F | 8.00% | Clearing point [° C.]: | 140 |
| CCQU-3-F | 20.00% | Δn [589 nm, 20° C.]: | 0.0946 |
| CCQU-5-F | 18.00% | | |
| CCP-3F.F.F | 8.00% | | |
| CCP-5F.F.F | 4.00% | | |
| CCGU-3-F | 10.00% | | |
| CCP-3-1 | 5.00% | | |
| CCP-3-3 | 3.00% | | |
| CCOC-3-3 | 3.00% | | |
| CCOC-4-3 | 3.00% | | |
| BCH-3F.F | 8.00% | | |
| BCH-5F.F | 10.00% | | |

EXAMPLE M7

| | | | |
|---|---|---|---|
| PGP-2-5 | 2.00% | Clearing point [° C.]: | 140 |
| CCGU-3-F | 8.00% | Δn [589 nm, 20° C.]: | 0.0946 |
| BCH-3F.F | 2.00% | | |
| BCH-5F.F | 6.00% | | |
| CCP-3F.F.F | 14.00% | | |
| CCP-5F.F.F | 6.00% | | |
| CCQU-2-F | 15.00% | | |
| CCQU-3-F | 18.00% | | |
| CCQU-5-F | 12.00% | | |
| CCP-3-1 | 3.00% | | |
| CCP-3-3 | 2.00% | | |
| ECCP-5F.F | 6.00% | | |
| CBC-33F | 3.00% | | |
| CBC-53F | 3.00% | | |

EXAMPLE M8

| | | | |
|---|---|---|---|
| CCQU-2-F | 15.00% | Clearing point [° C.]: | 131 |
| CCQU-3-F | 16.00% | Δn [589 nm, 20° C.]: | 0.0898 |
| CCQU-5-F | 14.00% | Δε [1 kHz, 20° C.]: | 12.7 |
| CCP-1F.F.F | 4.00% | γ₁ [mPa · s, 20° C.]: | 294 |
| CCP-2F.F.F | 7.00% | | |
| CCP-3F.F.F | 8.00% | | |
| CCP-5F.F.F | 5.00% | | |
| CCGU-3-F | 6.00% | | |
| CCP-3-1 | 8.00% | | |
| CBC-53F | 7.00% | | |
| CBC-33F | 4.00% | | |
| CDUQU-3-F | 6.00% | | |

EXAMPLE M9

| | | | |
|---|---|---|---|
| CCQU-2-F | 14.00% | Clearing point [° C.]: | 130 |
| CCQU-3-F | 16.00% | Δn [589 nm, 20° C.]: | 0.0814 |
| CCQU-5-F | 15.00% | Δε [1 kHz, 20° C.]: | 11.0 |
| CCP-2F.F.F | 7.00% | γ₁ [mPa · s, 20° C.]: | 274 |
| CCP-3F.F.F | 14.00% | | |
| CCP-5F.F.F | 5.00% | | |
| CCGU-3-F | 8.00% | | |
| CCP-3-1 | 8.00% | | |

-continued

| | |
|---|---|
| CCOC-3-3 | 3.00% |
| CCOC-4-3 | 4.00% |
| CCCG-3-F | 6.00% |

EXAMPLE M10

| | | | |
|---|---|---|---|
| CCQU-2-F | 14.00% | Clearing point [° C.]: | 127.9 |
| CCQU-3-F | 16.00% | Δn [589 nm, 20° C.]: | 0.0810 |
| CCQU-5-F | 15.00% | Δε [1 kHz, 20° C.]: | 11.5 |
| CCP-2F.F.F | 7.00% | γ₁ [mPa · s, 20° C.]: | 275 |
| CCP-3F.F.F | 14.00% | | |
| CCP-5F.F.F | 5.00% | | |
| CCGU-3-F | 8.00% | | |
| CCP-3-1 | 8.00% | | |
| CCOC-3-3 | 3.00% | | |
| CCOC-4-3 | 4.00% | | |
| CCCQU-3-F | 6.00% | | |

EXAMPLE M11

| | | | |
|---|---|---|---|
| CCQU-2-F | 14.00% | Clearing point [° C.]: | 127.9 |
| CCQU-3-F | 16.00% | Δn [589 nm, 20° C.]: | 0.0810 |
| CCQU-5-F | 15.00% | Δε [1 kHz, 20° C.]: | 11.6 |
| CCP-2F.F.F | 7.00% | γ₁ [mPa · s, 20° C.]: | 285 |
| CCP-3F.F.F | 14.00% | | |
| CCP-5F.F.F | 5.00% | | |
| CCGU-3-F | 8.00% | | |
| CCP-3-1 | 8.00% | | |
| CCOC-3-3 | 3.00% | | |
| CCOC-4-3 | 4.00% | | |
| CCCQU-3-OT | 6.00% | | |

EXAMPLE M12

| | | | |
|---|---|---|---|
| CCQU-2-F | 14.00% | Clearing point [° C.]: | 128.8 |
| CCQU-3-F | 16.00% | Δn [589 nm, 20° C.]: | 0.0796 |
| CCQU-5-F | 15.00% | | |
| CCP-2F.F.F | 7.00% | | |
| CCP-3F.F.F | 14.00% | | |
| CCP-5F.F.F | 5.00% | | |
| CCGU-3-F | 6.00% | | |
| CCP-3-1 | 8.00% | | |
| CCOC-3-3 | 3.00% | | |
| CCOC-4-3 | 4.00% | | |
| CCCQU-3-OT | 4.00% | | |
| CCCQU-3-F | 4.00% | | |

The invention claimed is:

1. A liquid-crystalline medium comprising a mixture of polar compounds having positive dielectric anisotropy, comprising at least one compound of the formula I in a total concentration of ≥40%,

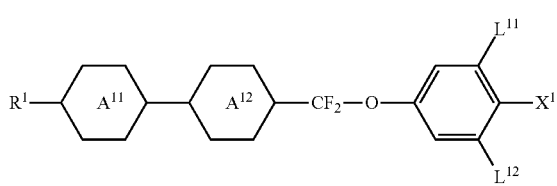

I from 6% to 13% of at least one compound of formula IV-8 or IV-11

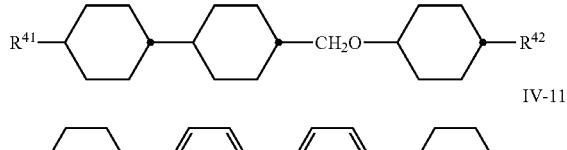

IV-8

IV-11 and
at least one compound of formula IB

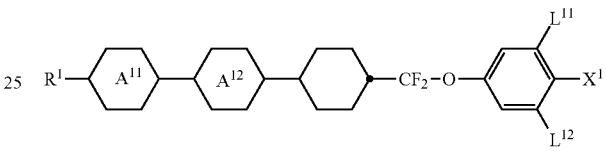

IB in which
$R^1$ denotes an alkyl or alkoxy radical having 1 to 15 C atoms, where one or more H atoms in these radicals may be replaced by F and, in addition, one or more $CH_2$ groups may each be replaced, independently of one another, by

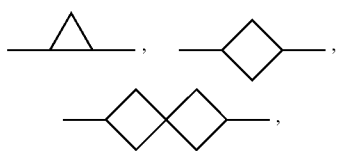

—C≡C—, —CH=CH—, —O—, —CO—O— or —O—CO— in such a way that O atoms are not linked directly to one another,

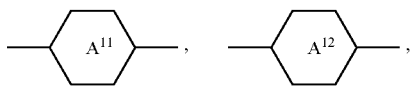

on each occurrence, identically or differently, denote

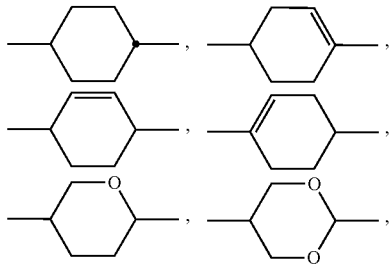

-continued

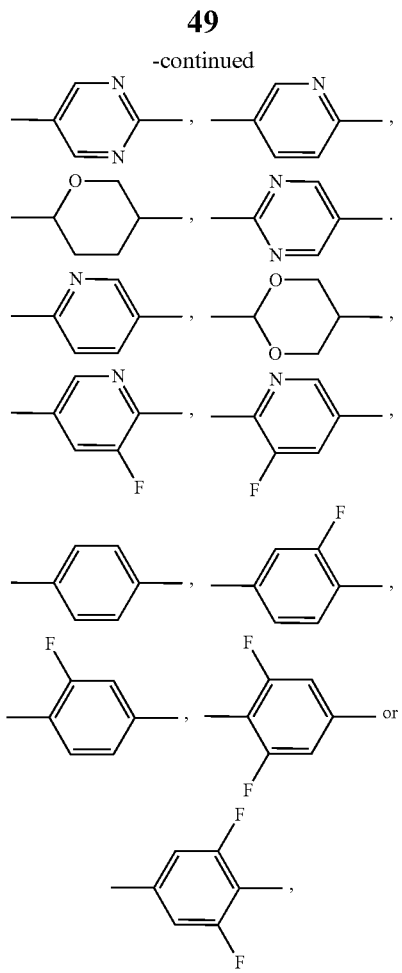

L¹¹ and L¹², independently of one another, denote H or F,

X¹ denotes F, Cl, CN, a halogenated alkyl radical, a halogenated alkenyl radical, a halogenated alkoxy radical or a halogenated alkenyloxy radical having up to 6 C atoms R⁴¹ and R⁴², independently of one another, denote n-alkyl having 1 to 7 C atoms, wherein the clearing temperature of said liquid-crystalline medium is at least 120° C.

2. The liquid-crystalline medium according to claim 1, comprising at least one compound of formulae I-1 to I-5,

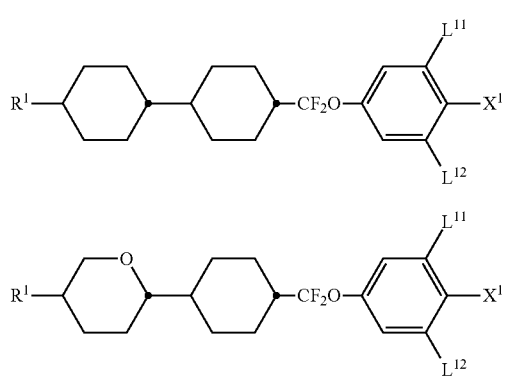

-continued

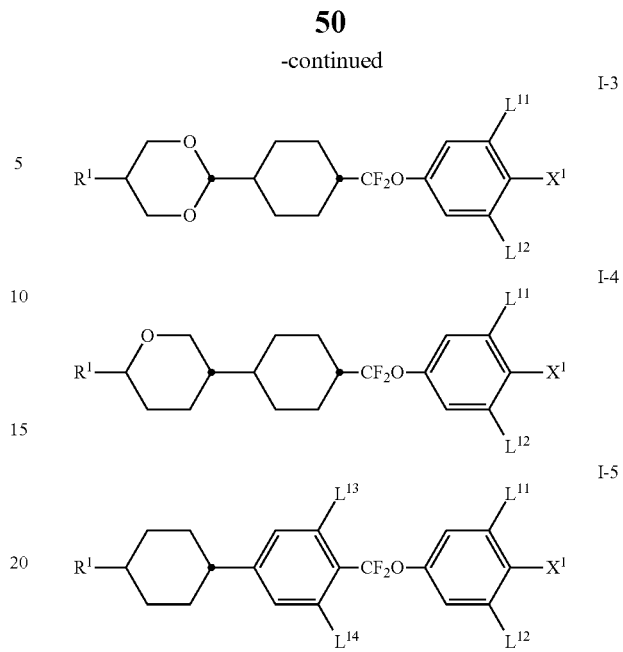

in the parameters have the meanings indicated in claim 1 and L¹³ and L¹⁴, independently of one another, denote H or F.

3. The liquid-crystalline medium according to claim 1, additionally comprising at least one compound of the formula II

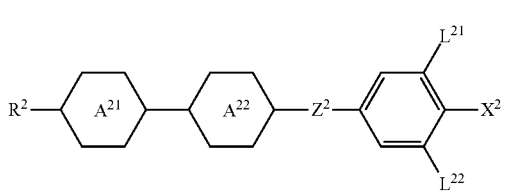

in which

R² denotes an alkyl or alkoxy radical having 1 to 15 C atoms, where one or more H atoms in these radicals may be replaced by F and, in addition, one or more CH₂ groups may each be replaced, independently of one another, by

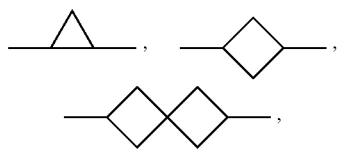

—C≡C—, —CH═CH—, —O—, —CO—O— or —O—CO— in such a way that O atoms are not linked directly to one another,

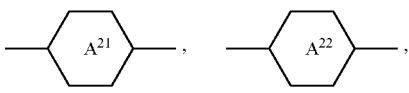

on each occurrence, identically or differently, denote

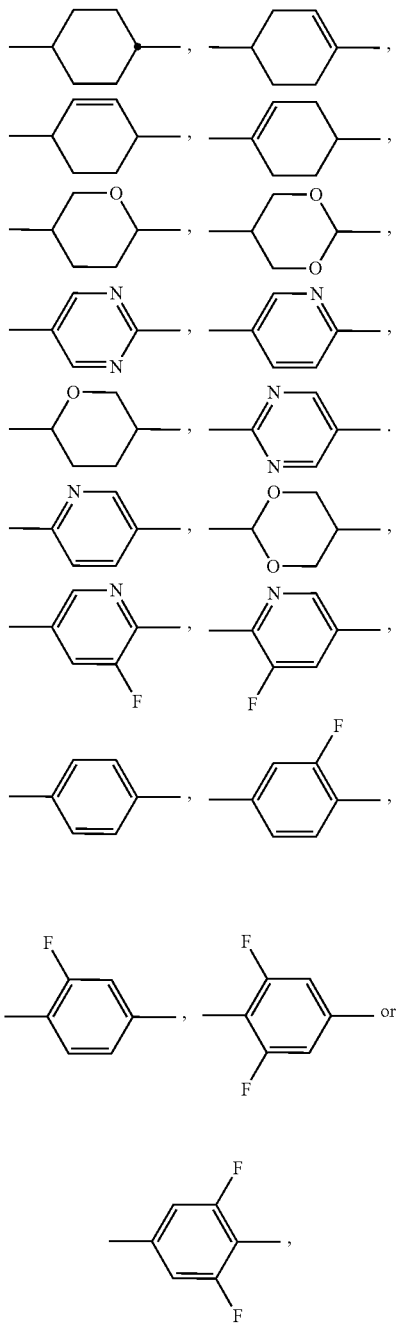

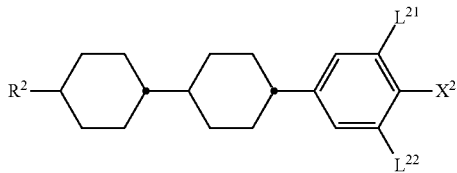

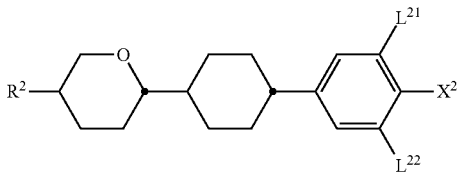

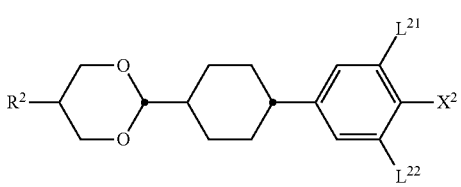

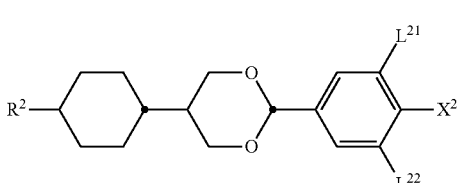

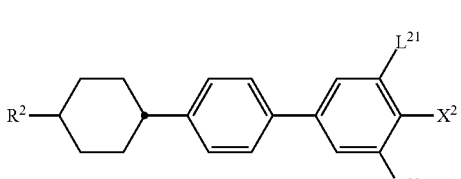

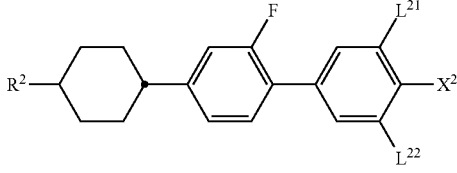

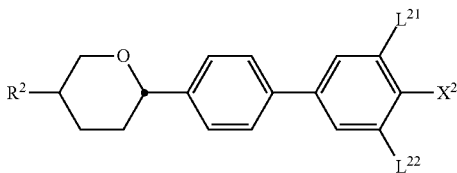

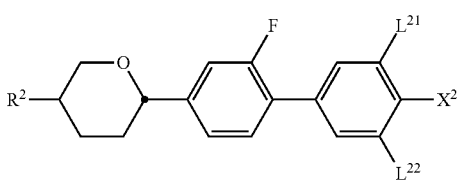

$L^{21}$ and $L^{22}$, independently of one another, denote H or F, $X^2$ denotes F, Cl, CN, a halogenated alkyl radical, a halogenated alkenyl radical, a halogenated alkoxy radical or a halogenated alkenyloxy radical having up to 6 C atoms, $Z^2$ denotes —CH$_2$CH$_2$—, —CF$_2$CF$_2$—, —COO—, trans —CH=CH—, trans —CF=CF—, —CH$_2$O— or a single bond.

4. The liquid-crystalline medium according to claim 3, wherein the at least one compound of the formula II are of the formulae II-1 to II-14,

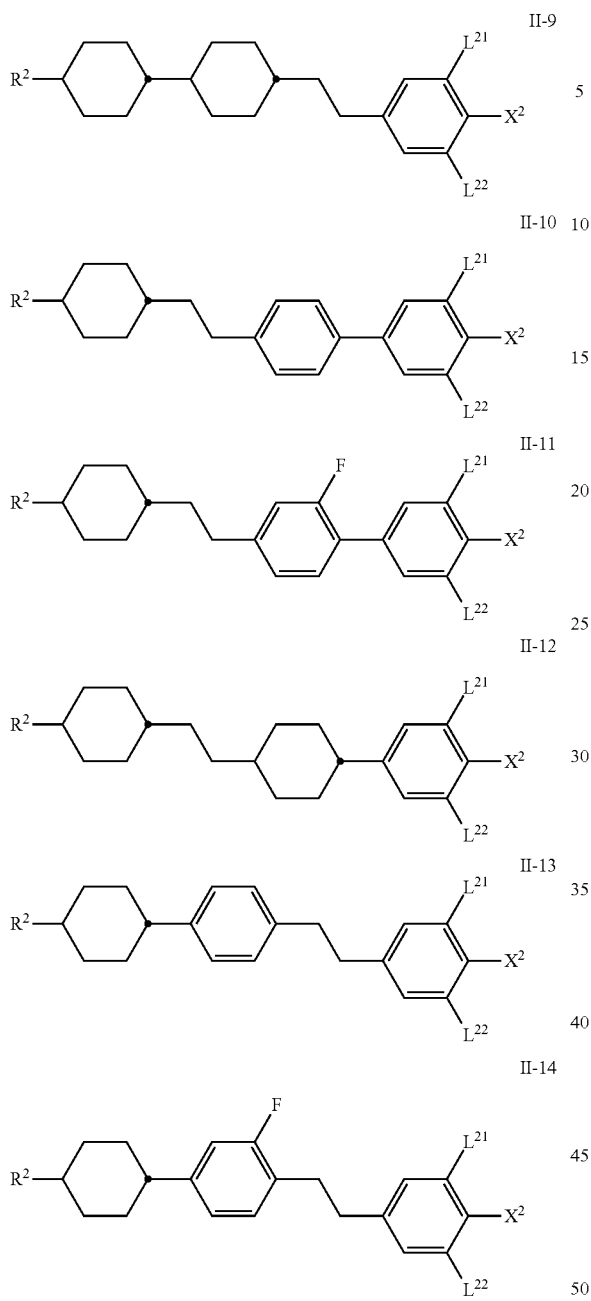

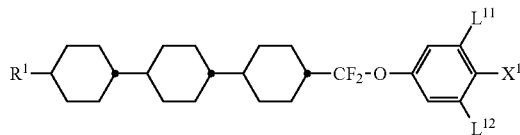

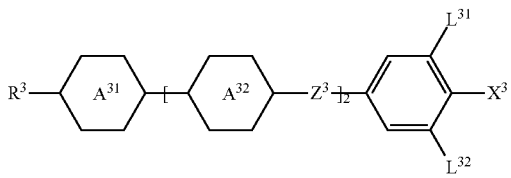

in which

R² denotes n-alkyl having up to 7 C atoms,

L²¹ and L²², independently of one another, denote H or F and

X² denotes F, Cl, halogenated alkyl or halogenated alkoxy having up to 6 C atoms.

5. The liquid-crystalline medium according to claim 3, wherein the total concentration of the compounds of the formula II is 18% to 50%.

6. The liquid-crystalline medium according to claim 1, wherein said liquid-crystalline medium additionally comprises at least one compound of the formulae IA or IB-1, wherein in formula IA R¹, A¹¹, A¹², L¹¹, L¹² and X¹ have the meanings indicated in claim 1 and L¹³ and L¹⁴ have the meaning indicated for L¹¹ and in formula IB-1 at least one of L¹¹ and L¹² denotes F and one of L¹¹ and L¹² has the meaning indicated in claim 1 and X¹ denotes F, Cl, CF₃ or OCF₃ and R¹ has the meanings indicated in claim 1.

7. The liquid-crystalline medium according to claim 1, wherein said liquid-crystalline medium additionally comprises at least one compound of the formula III,

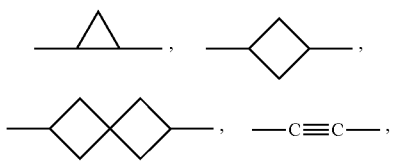

in which

R³ denotes an alkyl or alkoxy radical having 1 to 15 C atoms, where one or more H atoms in these radicals may be replaced by F and, in addition, one or more CH₂ groups may each be replaced, independently of one another, by

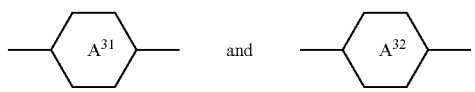

—CH═CH—, —O—, —CO—O— or —O—CO— in such a way that O atoms are not linked directly to one another, on each occurrence, independently of one another, denote

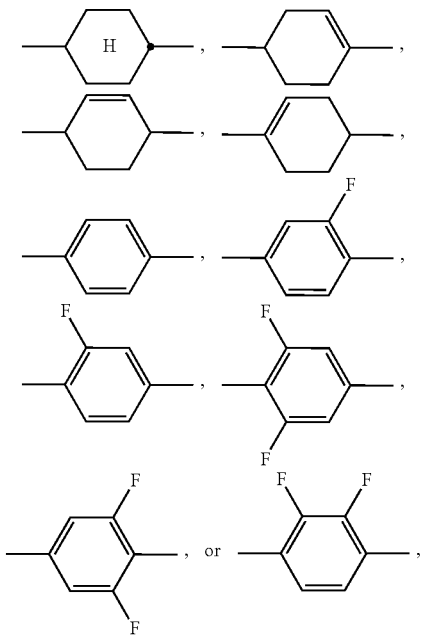

and

Z³ on each occurrence, independently of one another, denotes —CH$_2$CH$_2$—, —COO—, trans —CH═CH—, trans —CF═CF—, —CH$_2$O—, —C≡C—or a single bond, L$^{31}$, L$^{32}$ denote H or F, X³ denotes F, Cl, CN, a halogenated alkyl radical, a halogenated alkenyl radical, a halogenated alkoxy radical or a halogenated alkenyloxy radical having up to 6 C atoms.

8. The liquid-crystalline medium according to claim 7, wherein the at least one compound of the formula III is of the formulae III-1 to III-9,

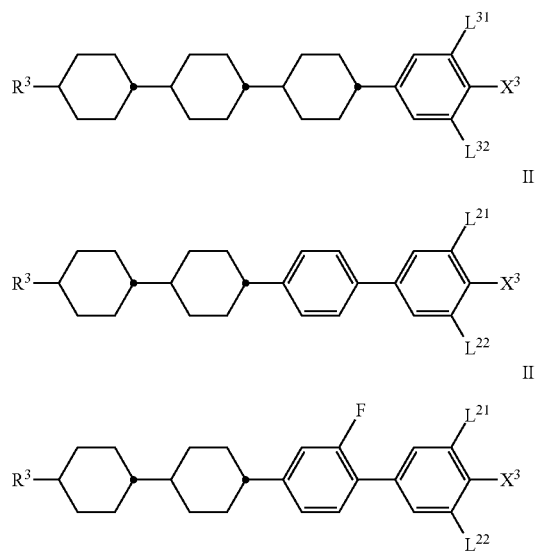

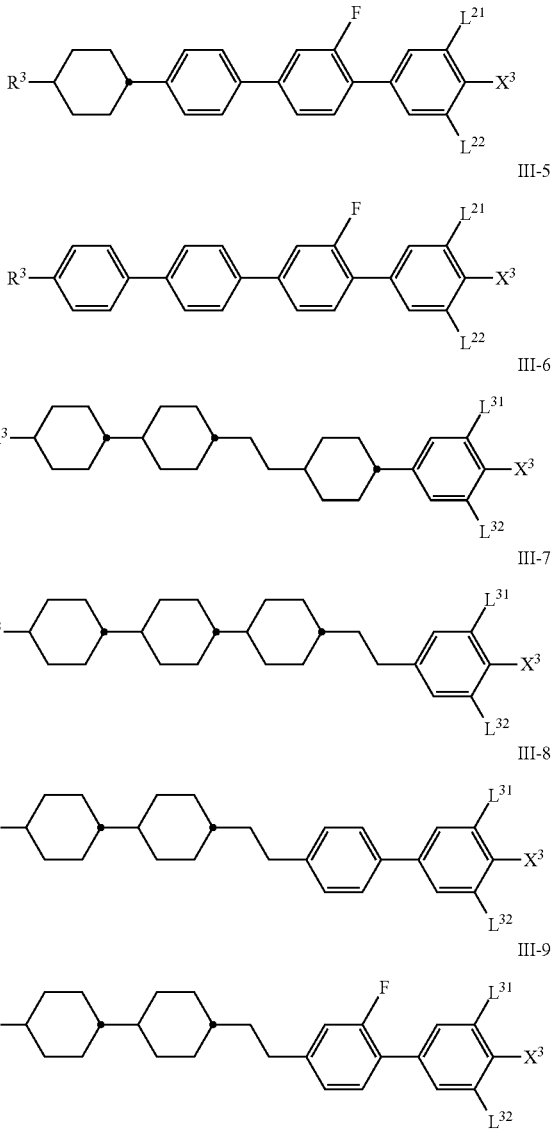

in which

R³, L$^{31}$ and L$^{32}$ have the meanings indicated in claim 7 and

X³ denotes F, Cl, halogenated alkyl or halogenated alkoxy having to 6 C atoms.

9. A method which comprises including a liquid-crystalline medium according to claim 1 in an electro-optical component.

10. A method according to claim 9 wherein the electro-optical component is a liquid-crystal light valve for lighting devices for motor vehicles or a liquid-crystal display.

11. An electro-optical component comprising a liquid-crystalline medium according to claim 1.

12. The electro-optical component according to claim 11, where the component is a liquid-crystal light valve.

13. A lighting device for motor vehicles containing a liquid-crystal light valve according to claim 12.

14. A liquid-crystal display containing a liquid-crystal light valve according to claim 12.

15. The liquid crystalline medium of claim 1, wherein the clearing temperature of said liquid-crystalline medium is at least 130° C.

16. The liquid crystalline medium of claim 1, wherein the clearing temperature of said liquid-crystalline medium is at least 140° C.

17. The liquid crystalline medium of claim 1, wherein the medium retain the nematic phase down to −30° C. and the nematic phase range is at least 140 K.

18. The liquid crystalline medium of claim 1, wherein the medium retain an optical anisotropy (Δn) from 0.060 to 0.100, have a clearing point of at least 130° C. and the nematic phase range is at least 180 K.

19. The liquid crystalline medium of claim 1, wherein the medium has a TN threshold below 2.0 V.

20. The liquid crystalline medium of claim 3, wherein the tota concentration of compounds of the formula II in the medium is from 23% to 45%.

* * * * *